(12) United States Patent
Tan et al.

(10) Patent No.: US 12,354,252 B2
(45) Date of Patent: Jul. 8, 2025

(54) SYSTEM FOR EVALUATING THE SCAN QUALITY OF A SCANNER AND A METHOD THEREOF

(71) Applicant: Synergy4Tech Holdings Pte. Ltd., Singapore (SG)

(72) Inventors: Kenneth Ngan Meng Tan, Singapore (SG); Kwok Wai Tam, Singapore (SG)

(73) Assignee: SYNERGY4TECH HOLDINGS PTE.LTD., Singapore (SG)

( * ) Notice: Subject to any disclaimer, the term of this patent is extended or adjusted under 35 U.S.C. 154(b) by 394 days.

(21) Appl. No.: 17/788,898

(22) PCT Filed: Dec. 24, 2020

(86) PCT No.: PCT/SG2020/050782
§ 371 (c)(1),
(2) Date: Jun. 24, 2022

(87) PCT Pub. No.: WO2021/133258
PCT Pub. Date: Jul. 1, 2021

(65) Prior Publication Data
US 2023/0066348 A1    Mar. 2, 2023

(30) Foreign Application Priority Data

Dec. 27, 2019   (SG) ............................ 10201913527R
Aug. 20, 2020   (SG) ............................ 10202008028P

(51) Int. Cl.
*G06T 7/00*    (2017.01)
(52) U.S. Cl.
CPC .................. *G06T 7/0004* (2013.01)

(58) Field of Classification Search
None
See application file for complete search history.

(56) References Cited

U.S. PATENT DOCUMENTS 5,689,443 A    11/1997  Ramanathan
8,600,149 B2   12/2013  Song et al.
(Continued)

OTHER PUBLICATIONS

J. Bendahan, "Vehicle and Cargo Scanning for Contraband," Conference on the Application of Accelerators in Research and Industry, CAARI 2016, Oct. 30-Nov. 4, 2016, Ft. Worth, TX, USA (Year: 2016).*

(Continued)

*Primary Examiner* — Soo Shin
(74) *Attorney, Agent, or Firm* — Patent Law Works LLP

(57) ABSTRACT

A system for evaluating the scan quality of a scanner on a test piece is provided. The system includes a processor and a memory in communication to the processor for storing instructions executable by the processor, such that the processor is configured to receive a scanned image of the test piece from the scanner, display the scanned image, generate a first score value based on the scanned image, display an evaluation input interface configured to receive user evaluation input based on the evaluation of the scanned image, and generate a second score value based on the user evaluation input, such that the first score value and the second score value are utilized to evaluate the scan quality of the scanner. Further, a method for evaluating the scan quality of the scanner is provided.

28 Claims, 30 Drawing Sheets

(56) References Cited

U.S. PATENT DOCUMENTS

| | | | |
|---|---|---|---|
| 9,720,114 B2* | 8/2017 | Blagojevic | G01V 5/20 |
| 2006/0098773 A1* | 5/2006 | Peschmann | G01N 23/04 |
| | | | 378/57 |
| 2006/0193433 A1* | 8/2006 | Ledoux | G01N 23/223 |
| | | | 378/57 |
| 2009/0034790 A1* | 2/2009 | Song | G01V 5/226 |
| | | | 378/10 |
| 2009/0257555 A1* | 10/2009 | Chalmers | G01V 5/232 |
| | | | 378/57 |
| 2010/0246754 A1* | 9/2010 | Morton | A61B 6/4014 |
| | | | 378/57 |
| 2011/0255762 A1 | 10/2011 | Deischinger et al. | |
| 2011/0266427 A1 | 11/2011 | Blagojevic | |
| 2020/0161005 A1* | 5/2020 | Lyman | G06N 5/04 |

OTHER PUBLICATIONS

Chen et al., "Improving CT quality with optimized image parameters for radiation treatment planning and delivery guidance," Physics and Imaging in Radiation Oncology, Oct. 2017, vol. 4, pp. 6-11.

International Search Report and Written Opinion for International Application No. PCT/SG2020/050782, mailed Apr. 16, 2021, 9 pgs.

Kruth et al., "Computed tomography for dimensional metrology," CIRP Annals—Manufacturing Technology, vol. 60, 2011, pp. 821-842.

Shrestha et al., "A quantitative approach to evaluate image quality of whole slide imaging scanners," Journal of Pathology Informatics, Dec. 30, 2016, vol. 7, No. 56, 10 pgs.

Wolstenhulme et al., "Agreement between objective and subjective assessment of image quality in ultrasound abdominal aortic aneurism screening," British Journal of Radiology, Jan. 1, 2015, 88:20140482, 9 pgs.

EPO Communication, European Patent Office Extended European Search Report Application No. 20907818.7 Synergy4Tech Holdings PTe Ltd. Mailed Nov. 21, 2023.

Wolstenhulme, S, et al. "Agreement between Objective and Subjective Assessment of Image Quality in Ultrasound Abdominal Aortic Aneurism Screening." The British Journal of Radiology, vol. 88, No. 1046, Feb. 2015, p. 20140482, doi: 10.1259/bjr.20140482.

IPI Communication, Intellectual Property India Examination Report Application No. 202247043108 Synergy4Tech Holdings Pte Ltd. Mailed Mar. 17, 2025.

* cited by examiner

412

| Scoring Sheet - Test 1 ||||||||||
| Subjective, Air ||| Objective, Density, Air ||| Objective, Z-eff, Air |||
| Is step visible in air? | Points Available if visible | Test Score ||Contrast-to-Noise Ratio > | Points available | Test Score || Contrast-to-Noise Ratio > | Points available | Test Score ||
|  |  | Inner Ring | Outer Ring |  |  | Inner Ring | Outer Ring |  |  | Inner Ring | Outer Ring |
| Step 1 | 2 | | | Step 1 | 2 | | | Step 1 | 2 | | |
| Step 2 | 2 | | | Step 2 | 2 | | | Step 2 | 2 | | |
| Step 3 | 2 | | | Step 3 | 2 | | | Step 3 | 2 | | |
| Step 4 | 2 | | | Step 4 | 2 | | | Step 4 | 2 | | |
| Step 5 | 2 | | | Step 5 | 2 | | | Step 5 | 2 | | |
| Step 6 | 2 | | | Step 6 | 2 | | | Step 6 | 2 | | |
| Step 7 | 2 | | | Step 7 | 2 | | | Step 7 | 2 | | |
| Step 8 | 2 | | | Step 8 | 2 | | | Step 8 | 2 | | |
| Test 1 Score, Sub | | 0 | 0 | Test 1 Score, Obj D | | 0 | 0 | Test 1 Score, Obj Z | | 0 | 0 |
| Subjective, Perspex ||| Objective, Density, Perspex ||| Objective, Z-eff, Perspex |||
| Is step visible in air? | Points Available if visible | Test Score ||Contrast-to-Noise Ratio > | Points Available | Test Score || Contrast-to-Noise Ratio > | Points Available | Test Score ||
|  |  | Inner Ring | Outer Ring |  |  | Inner Ring | Outer Ring |  |  | Inner Ring | Outer Ring |
| Step 1 | 2 | | | Step 1 | 2 | | | Step 1 | 2 | | |
| Step 2 | 3 | | | Step 2 | 3 | | | Step 2 | 3 | | |
| Step 3 | 3 | | | Step 3 | 3 | | | Step 3 | 3 | | |
| Step 4 | 3 | | | Step 4 | 3 | | | Step 4 | 3 | | |
| Step 5 | 2 | | | Step 5 | 2 | | | Step 5 | 2 | | |
| Step 6 | 1 | | | Step 6 | 1 | | | Step 6 | 1 | | |
| Step 7 | 1 | | | Step 7 | 1 | | | Step 7 | 1 | | |
| Step 8 | 1 | | | Step 8 | 1 | | | Step 8 | 1 | | |
| Test 1 Score, Sub | | 0 | 0 | Test 1 Score, Obj D | | 0 | 0 | Test 1 Score, Obj Z | | 0 | 0 |
| Test 1 Total, Sub | 0 | | | Test 1 Total, Obj D | 0 | | | Test 1 Total, Obj Z | 0 | | |

| Scoring Sheet - Test 2 |||| |||
| Subjective Test ||| Objective Test |||
| Test Region | Points available | Points awarded | Test Region | Points available | Points awarded |
|---|---|---|---|---|---|
|  |  |  | 1 | 1 |  |
| 1 and 2 | 2 |  | 2 | 1 |  |
|  |  |  | 3 | 1 |  |
| 3 and 4 | 2 |  | 4 | 1 |  |
|  |  |  | 5 | 2 |  |
| 5 and 6 | 4 |  | 6 | 2 |  |
|  |  |  | 7 | 4 |  |
| 7 and 8 | 8 |  | 8 | 4 |  |
| Test 2 Score, Sub |  |  | Test 2 Score, Obj |  |  |

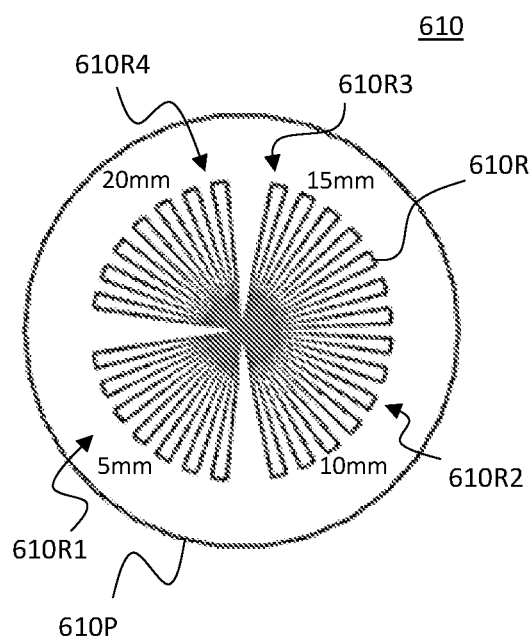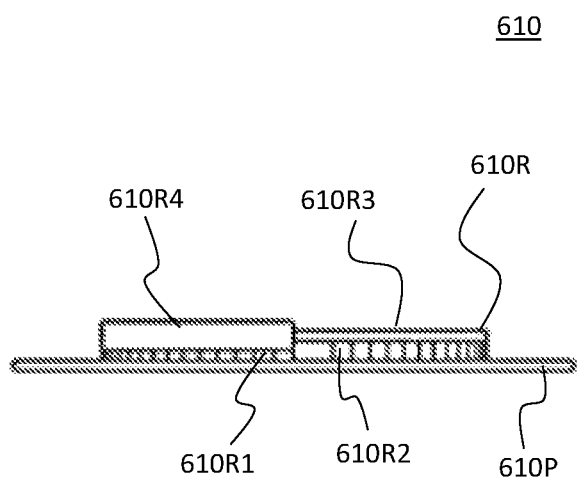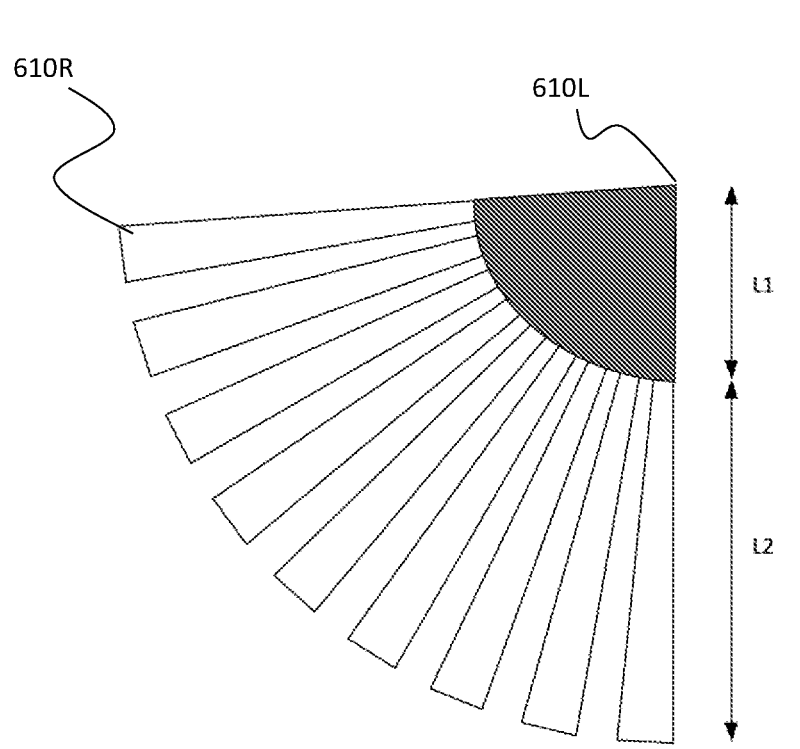
Fig. 6A
Fig. 6B
Fig. 6C

612M

| Test Region | Measured Resolution (mm) | Points Awarded | Test Region | Measured Resolution (mm) | Points Awarded | Test Region | Measured Resolution (mm) | Points Awarded | Test Region | Measured Resolution (mm) | Points Awarded |
|---|---|---|---|---|---|---|---|---|---|---|---|
| 5mm | 1 | 40 | 10mm | 1 | 30 | 15mm | 1 | 20 | 20mm | 1 | 10 |
| | 2 | 36 | | 2 | 27 | | 2 | 18 | | 2 | 9 |
| | 3 | 32 | | 3 | 24 | | 3 | 16 | | 3 | 8 |
| | 4 | 28 | | 4 | 21 | | 4 | 14 | | 4 | 7 |
| | 5 | 24 | | 5 | 18 | | 5 | 12 | | 5 | 6 |
| | 6 | 20 | | 6 | 15 | | 6 | 10 | | 6 | 5 |
| | 7 | 16 | | 7 | 12 | | 7 | 8 | | 7 | 4 |
| | 8 | 12 | | 8 | 9 | | 8 | 6 | | 8 | 3 |
| | 9 | 8 | | 9 | 6 | | 9 | 4 | | 9 | 2 |
| | 10 | 4 | | 10 | 3 | | 10 | 2 | | 10 | 1 |

| Scoring Sheet - Test 3 |||||||
|---|---|---|---|---|---|
| Subjective Test ||| Objective Test |||
| Test Region | Measured Resolution (mm) | Points awarded | Test Region | Measured Resolution (mm) | Points awarded |
| 5mm | 6 | 20 | 5mm | 6 | 20 |
| 10mm | 5 | 18 | 10mm | 5 | 18 |
| 15mm | 4 | 14 | 15mm | 4 | 14 |
| 20mm | 4 | 7 | 20mm | 3.5 | 8 |
| Test 3 Score, Sub || 9.4 | Test 3 Score, Obj || 9.6 |

Fig. 6E

| Scoring Sheet - Test 4 |||| ||||
|---|---|---|---|---|---|---|---|
| Subjective Test |||| Objective Test ||||
| Test Region | Number of Holes Visible | Points Available Per Hole | Points awarded | Test Region | Number of Holes Visible | Points Available Per Hole | Points awarded |
| 10mm | | 1 | 0 | 10mm | | 1 | 0 |
| 8mm | | 1 | 0 | 8mm | | 1 | 0 |
| 6mm | | 2 | 0 | 6mm | | 2 | 0 |
| 4mm | | 2 | 0 | 4mm | | 2 | 0 |
| 2mm | | 4 | 0 | 2mm | | 4 | 0 |
| 1mm | | 6 | 0 | 1mm | | 6 | 0 |
| Test 4 Score, Sub ||| 0.0 | Test 4 Score, Obj ||| 0.0 |

812

| Scoring Sheet - Test 5 ||||| Objective Test ||||
|---|---|---|---|---|---|---|---|
| Subjective Test |||| Objective Test ||||
| Test Region | Wire Artefact Visible? | Points Available if No | Points awarded | Test Region | Wire Artefact Visible? | Points Available if No | Points awarded |
| 1mm wires |  | 2 | 0 | 1mm wires |  | 2 | 0 |
| 2mm wires |  | 2 | 0 | 2mm wires |  | 2 | 0 |
| 4mm wires |  | 4 | 0 | 4mm wires |  | 4 | 0 |
| 8mm wires |  | 8 | 0 | 8mm wires |  | 8 | 0 |
| Test 5 Score, Sub ||| 0 | Test 5 Score, Obj ||| 0 |

912

| Scoring Sheet - Test 6 |||||||||
| Subjective Test |||| Objective Test ||||
| Test Region | Feature Visible? | Points Available if Yes | Points awarded | Test Region | Feature Visible? | Points Available if Yes | Points awarded |
|---|---|---|---|---|---|---|---|
| 24AWG wire | | 1 | 0 | 24AWG wire | | 1 | 0 |
| 30AWG wire | | 1 | 0 | 30AWG wire | | 1 | 0 |
| 32AWG wire | | 2 | 0 | 32AWG wire | | 2 | 0 |
| 36AWG wire | | 4 | 0 | 36AWG wire | | 4 | 0 |
| 1mm Grid | | 2 | 0 | 1mm Grid | | 2 | 0 |
| 2mm Grid | | 2 | 0 | 2mm Grid | | 2 | 0 |
| 3mm Grid | | 2 | 0 | 3mm Grid | | 2 | 0 |
| 4mm Grid | | 1 | 0 | 4mm Grid | | 1 | 0 |
| 6mm Grid | | 1 | 0 | 6mm Grid | | 1 | 0 |
| Test 6 Score, Sub ||| 0 | Test 6 Score, Obj ||| 0 |

Fig. 9B

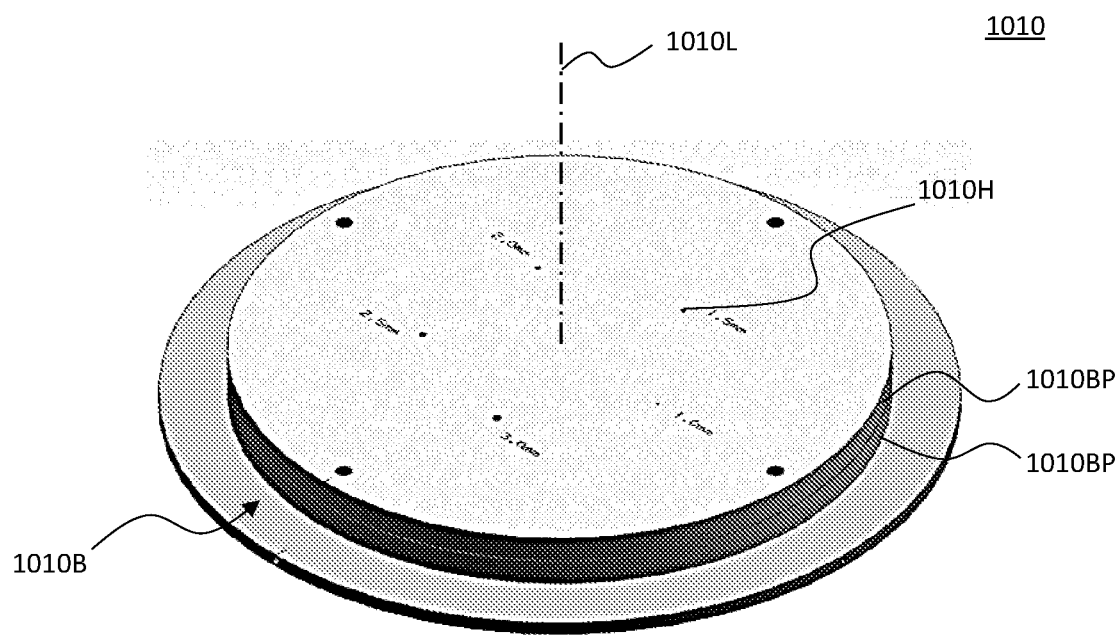
Fig. 10
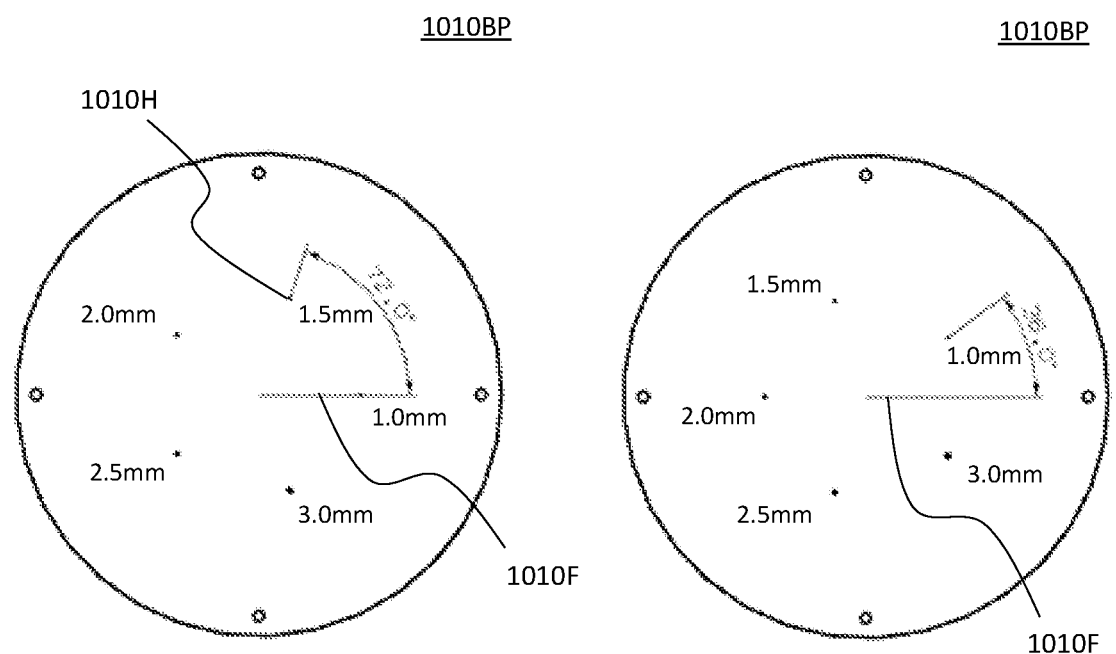
Fig. 10A
Fig. 10B

1012

| Scoring Sheet - Test 7 |||||||| 
|---|---|---|---|---|---|---|---|
| Subjective Test |||| Objective Test ||||
| Test Region | Feature Visible? | Points Available if Yes | Points awarded | Test Region | Feature Visible? | Points Available if Yes | Points awarded |
| 1.0mm | | 2 | 0 | 1.0mm | | 2 | 0 |
| 1.5mm | | 2 | 0 | 1.5mm | | 2 | 0 |
| 2.0mm | | 2 | 0 | 2.0mm | | 2 | 0 |
| 2.5mm | | 1 | 0 | 2.5mm | | 1 | 0 |
| 3.0mm | | 1 | 0 | 3.0mm | | 1 | 0 |
| 1.0mm filled | | 2 | 0 | 1.0mm filled | | 2 | 0 |
| 1.5mm filled | | 2 | 0 | 1.5mm filled | | 2 | 0 |
| 2.0mm filled | | 2 | 0 | 2.0mm filled | | 2 | 0 |
| 2.5mm filled | | 1 | 0 | 2.5mm filled | | 1 | 0 |
| 3.0mm filled | | 1 | 0 | 3.0mm filled | | 1 | 0 |
| Test 7 Score, Sub | | | 0 | Test 7 Score, Obj | | | 0 |

| Scoring Sheet - Overall Test Summary ||||
|---|---|---|---|
| Subjective Test || Objective Test ||
| XTE-CT Test | Points awarded | XTE-CT Test | Points awarded |
| Test 1 - Contrast, Density, Z | 8 | Test 1 - Contrast, Density, Z | 10 |
| Test 2 - Beam hardening | 4 | Test 2 - Beam hardening | 6 |
| Test 3 - Spatial Resolution | 9 | Test 3 - Spatial Resolution | 10 |
| Test 4 - Contrast Detail | 10 | Test 4 - Contrast Detail | 12 |
| Test 5 - Metal Artefact | 4 | Test 5 - Metal Artefact | 8 |
| Test 6 - Grid and Wire Resolution | 8 | Test 6 - Grid and Wire | 12 |
| Test 7 - Small Inclusions | 10 | Test 7 - Small Inclusions | 14 |
| Overall test score, Sub (%) | 47 | Overall test score, Obj (%) | 64 |

Fig. 10D

| Scoring Sheet - Test 1, Penetration |||||||
|---|---|---|---|---|---|---|---|
| Subjective Test |||| Objective Test ||||
| Test Region | Is Step Visible? | Points Available | Points Awarded | Test Region | Is Step Visible? | Points Available | Points Awarded |
| Step 1 |  | 2 | 0 | Step 1 |  | 2 | 0 |
| Step 2 |  | 2 | 0 | Step 2 |  | 2 | 0 |
| Step 3 |  | 2 | 0 | Step 3 |  | 2 | 0 |
| Step 4 |  | 2 | 0 | Step 4 |  | 2 | 0 |
| Step 5 |  | 2 | 0 | Step 5 |  | 2 | 0 |
| Step 6 |  | 2 | 0 | Step 6 |  | 2 | 0 |
| Step 7 |  | 2 | 0 | Step 7 |  | 2 | 0 |
| Step 8 |  | 2 | 0 | Step 8 |  | 2 | 0 |
| Test 1 Score, Sub || | 0 | Test 1 Score, Obj || | 0 |

1312

1410

1412

| Scoring Sheet - Test 2, Material Discrimination ||||||||
|---|---|---|---|---|---|---|---|
| Subjective Test |||| Objective Test ||||
| Test Region | Unique Colour? | Points Available | Points Awarded | Test Region | Correct Z-eff? | Points Available | Points Awarded |
| 1 |  | 2 | 0 | 1 |  | 2 | 0 |
| 2 |  | 2 | 0 | 2 |  | 2 | 0 |
| 3 |  | 2 | 0 | 3 |  | 2 | 0 |
| 4 |  | 2 | 0 | 4 |  | 2 | 0 |
| 5 |  | 2 | 0 | 5 |  | 2 | 0 |
| 6 |  | 2 | 0 | 6 |  | 2 | 0 |
| 7 |  | 2 | 0 | 7 |  | 2 | 0 |
| 8 |  | 2 | 0 | 8 |  | 2 | 0 |
| Test 2 Score, Sub ||  | 0 | Test 2 Score, Obj ||  | 0 |

| Scoring Sheet - Test 3, Spatial Resolution ||||||||
| Subjective Test |||| Objective Test ||||
| Test Region | Region Visible? | Points Available | Points Awarded | Test Region | Region Visible? | Points Available | Points Awarded |
| --- | --- | --- | --- | --- | --- | --- | --- |
| 0.5mm | | 8 | 0 | 0.5mm | | 8 | 0 |
| 1.0mm | | 6 | 0 | 1.0mm | | 6 | 0 |
| 1.5mm | | 4 | 0 | 1.5mm | | 4 | 0 |
| 2.0mm | | 3 | 0 | 2.0mm | | 3 | 0 |
| 2.5mm | | 2 | 0 | 2.5mm | | 2 | 0 |
| 3.0mm | | 1 | 0 | 3.0mm | | 1 | 0 |
| Test 3 Score, Sub ||| 0 | Test 3 Score, Obj ||| 0 |

1512

| Scoring Sheet - Test 4, Grid Resolution |||||| |||||
|---|---|---|---|---|---|---|---|---|---|
| Subjective Test |||||| Objective Test ||||
| Test Region | Grid Visible Vertical? | Grid Visible Horizontal? | Points Available | Points Awarded | Test Region | Grid Visible Vertical? | Grid Visible Horizontal? | Points Available | Points Awarded |
| 3.0mm | | | 1 | 0 | 3.0mm | | | 1 | 0 |
| 2.5mm | | | 1 | 0 | 2.5mm | | | 1 | 0 |
| 2.0mm | | | 2 | 0 | 2.0mm | | | 2 | 0 |
| 1.5mm | | | 2 | 0 | 1.5mm | | | 2 | 0 |
| 1.0mm | | | 4 | 0 | 1.0mm | | | 4 | 0 |
| 0.5mm | | | 6 | 0 | 0.5mm | | | 6 | 0 |
| Test 4 Score, Sub | | | | 0.0 | Test 4 Score, Obj | | | | 0.0 |

1712

| Scoring Sheet - Test 5, Wire Resolution |||||||
|---|---|---|---|---|---|
| Subjective Test ||| Objective Test |||
| Test Region | No. Wires Visible | Points Awarded | Test Region | No. Wires Visible | Points Awarded |
| 1 |  | 0 | 1 |  | 0 |
| 2 |  | 0 | 2 |  | 0 |
| 3 |  | 0 | 3 |  | 0 |
| 4 |  | 0 | 4 |  | 0 |
| 5 |  | 0 | 5 |  | 0 |
| 6 |  | 0 | 6 |  | 0 |
| 7 |  | 0 | 7 |  | 0 |
| 8 |  | 0 | 8 |  | 0 |
| Test 5 Score, Sub || 0.0 | Test 5 Score, Obj || 0.0 |

| Test Region | Step Thickness (mm) | Points Awarded | Test Region | Step Thickness (mm) | Points Awarded | Test Region | Step Thickness (mm) | Points Awarded | Test Region | Step Thickness (mm) | Points Awarded |
|---|---|---|---|---|---|---|---|---|---|---|---|
| 30 AWG | 0 | 4 | 34 AWG | 0 | 8 | 36 AWG | 0 | 12 | 40 AWG | 0 | 16 |
|  | 1 | 4 |  | 1 | 8 |  | 1 | 12 |  | 1 | 16 |
|  | 2 | 4 |  | 2 | 8 |  | 2 | 12 |  | 2 | 16 |
|  | 3 | 4 |  | 3 | 8 |  | 3 | 12 |  | 3 | 16 |
|  | 4 | 5 |  | 4 | 10 |  | 4 | 15 |  | 4 | 20 |
|  | 5 | 6 |  | 5 | 12 |  | 5 | 18 |  | 5 | 24 |
|  | 6 | 7 |  | 6 | 14 |  | 6 | 21 |  | 6 | 28 |
|  | 7 | 8 |  | 7 | 16 |  | 7 | 24 |  | 7 | 32 |

| Scoring Sheet - Test 6, Contrast Detail |||||||
|---|---|---|---|---|---|
| Subjective Test ||| Objective Test |||
| Test Region | Holes Visible | Points awarded | Test Region | Holes Visible | Points awarded |
| 1 |  | 0 | 1 |  | 0 |
| 2 |  | 0 | 2 |  | 0 |
| 3 |  | 0 | 3 |  | 0 |
| 4 |  | 0 | 4 |  | 0 |
| 5 |  | 0 | 5 |  | 0 |
| 6 |  | 0 | 6 |  | 0 |
| 7 |  | 0 | 7 |  | 0 |
| 8 |  | 0 | 8 |  | 0 |
| Test 6 Score, Sub || 0 | Test 6 Score, Obj || 0 |

| Test Region | Step Thickness (mm) | Points Awarded | Test Region | Step Thickness (mm) | Points Awarded | Test Region | Step Thickness (mm) | Points Awarded | Test Region | Step Thickness (mm) | Points Awarded |
|---|---|---|---|---|---|---|---|---|---|---|---|
| 0.5mm | 0 | 16 | 1.0mm | 0 | 12 | 2.0mm | 0 | 8 | 3.0mm | 0 | 4 |
|  | 1 | 16 |  | 1 | 12 |  | 1 | 8 |  | 1 | 4 |
|  | 2 | 16 |  | 2 | 12 |  | 2 | 8 |  | 2 | 4 |
|  | 3 | 16 |  | 3 | 12 |  | 3 | 8 |  | 3 | 4 |
|  | 4 | 20 |  | 4 | 15 |  | 4 | 10 |  | 4 | 5 |
|  | 5 | 24 |  | 5 | 18 |  | 5 | 12 |  | 5 | 6 |
|  | 6 | 28 |  | 6 | 21 |  | 6 | 14 |  | 6 | 7 |
|  | 7 | 32 |  | 7 | 24 |  | 7 | 16 |  | 7 | 8 |

| Scoring Sheet - Overall Test Summary | | | |
|---|---|---|---|
| Subjective Test | | Objective Test | |
| XTE-Check: Subjective Test | Points Awarded | XTE-Check: Objective Test | Points Awarded |
| Test 1 - Steel Penetration | 0 | Test 1 - Steel Penetration | 0 |
| Test 2 - Materials Discrimination | 0 | Test 2 - Materials Discrimination | 0 |
| Test 3 - Spatial Resolution | 0 | Test 3 - Spatial Resolution | 0 |
| Test 4 - Grid Resolution | 0 | Test 4 - Grid Resolution | 0 |
| Test 5 - Wire Resolution | 0 | Test 5 - Wire Resolution | 0 |
| Test 6 - Contrast Detail | 0 | Test 6 - Contrast Detail | 0 |
| Overall Test Score, Sub (%) | 0 | Overall Test Score, Obj (%) | 0 |

Fig. 19

SYSTEM FOR EVALUATING THE SCAN QUALITY OF A SCANNER AND A METHOD THEREOF

CROSS-REFERENCE TO RELATED APPLICATIONS

The present application is a national phase entry under 35 U.S.C. § 371 of International Patent Application No. PCT/SG2020/050782, filed 24 Dec. 2020, designating the United States of America and published in English as International Patent Publication No. WO 2021/133258 on 1 Jul. 2021, which claims the benefit of Singapore patents application Ser. Nos. 10201913527R filed on 27 Dec. 2019 and 10202008028P filed on 20 Aug. 2020; all of which are incorporated by reference herein.

TECHNICAL FIELD

The present invention relates to a system for evaluating the scan quality of a scanner and a method thereof.

BACKGROUND

Scanners are used widely at customs of countries to identify items that pass through the customs. For example, CT scanners and X-ray scanners are used to scan cargo and luggage to detect and illegal or dangerous items entering the country or leaving the country and entering the transportation, e.g. planes, ships. Nowadays, with ever increasing logistic and human traffic, it is critical that scanners are able to scan the items more quickly and accurately. Therefore, it is important that the scanners are maintained and tested regularly tested to ensure that they are performing at optimal level and above a required standard.

There are systems available that enables scanners to be tested. Such a system typically includes a test piece that is being passed through the scanner so that a scanned image of the test piece can be captured and subsequently evaluated. However, such a test piece is bulky and cumbersome, thus difficult to handle. Furthermore, for multi-view X-ray scanners, the test piece has to be adjusted to face each view of the scanner and pass through the scanner each time a view has to be tested. Hence, the time required to test the multi-view scanner would be considerably long. For customs with high traffic through the day, any pro-long period of downtime for the scanner would lower the efficiency of the customs. In addition, the test piece may not be able to properly test the scanners as the test piece may not be able to provide scanned images that are useful for evaluating the scanner accurately.

When the test piece is scanned, the scanned images are usually visually inspected and evaluated by the officer or the tester. Therefore, the test results may be highly inconsistent as the opinion of one officer may differ from another. When a number of scanners are being tested, the inconsistent test results would cause the calibration and performance of the scanners to be inaccurate. While there are systems that automatically evaluate the scanned images to evaluate the test results, due to system limitations, e.g. poor evaluation program, test piece, the evaluation by the system may not be accurate. Therefore, the present available systems do not efficiently and accurately test the scanners.

It is therefore important to be able to have a system that overcomes the abovementioned problems.

SUMMARY

According to various embodiments, a system for evaluating the scan quality of a scanner on a test piece is provided. The system includes a processor and a memory in communication to the processor for storing instructions executable by the processor, such that the processor is configured to receive a scanned image of the test piece from the scanner, display the scanned image, generate a first score value based on the scanned image, display an evaluation input interface configured to receive user evaluation input based on the evaluation of the scanned image, and generate a second score value based on the user evaluation input, such that the first score value and the second score value are utilized to evaluate the scan quality of the scanner.

According to various embodiments, the processor may be configured to determine at least one region of interest (ROI) in the scanned image and analyse the at least one ROI to generate the first score value.

According to various embodiments, the processor may be configured to retrieve a template comprising at least one pre-determined ROI, map the template onto the scanned image to determine the at least one ROI in the scanned image.

According to various embodiments, the processor may be configured to extract image data from the at least one ROI of the scanned image and generate statistical data from the extracted image data to analyse the image data of the at least one ROI.

According to various embodiments, the at least one of ROI may be determined based on the test piece.

According to various embodiments, the template may be determined based on the test piece.

According to various embodiments, the test piece may be optimised for CT image quality analysis.

According to various embodiments, the scanner may include a field of view in the range of 100 mm×100 mm to 2000 mm×2000 mm.

According to various embodiments, the scanned image may include an image resolution in the range of 0.5 mm to 10.0 mm reconstructed voxel.

According to various embodiments, the scanner may include a helical scan system with a scanning speed in the range of 0.01 m/s to 10.00 m/s.

According to various embodiments, the test piece may be optimised for transmission X-ray image quality analysis.

According to various embodiments, the scanner may include a field of view in the range of 300 mm×300 mm to 4500 mm×6000 mm.

According to various embodiments, the scanned image may include an image resolution in the range of 0.3 mm to 10 mm spatial resolution.

According to various embodiments, the scanner may include a linear X-ray system with a scanning speed in the range of 0.01 m/s to 100 km/h.

According to various embodiments, the test piece may be optimised for backscatter X-ray image quality analysis.

According to various embodiments, the scanner may include a field of view in the range of 300 mm×300 mm to 5000 mm×12000 mm spatial resolution.

According to various embodiments, the scanner may include a linear backscatter scanning system with a scanning speed in the range of 0.01 m/s to 20 km/h.

According to various embodiments, the scanned image may include an image resolution in the range of 0.5 mm to 20 mm.

According to various embodiments, the scanner may be an X-Ray scanner.

According to various embodiments, a computer-implemented method for evaluating the scan quality of a scanner on a test piece is provided. The method includes receiving a scanned image of the test piece from the scanner, displaying the scanned image, generating a first score value for the scanned image, displaying an evaluation input interface configured to receive user evaluation input based on the evaluation of the scanned image, and generating a second score value based on the user evaluation input, such that the first score value and the second score value are utilized to evaluate the scan quality of the scanner.

According to various embodiments, the method may further include determining at least one region of interest (ROI) in the scanned image and analysing the at least one ROI to generate the first score value.

According to various embodiments, the method may further include retrieving a template comprising at least one pre-determined ROI, mapping the template onto the scanned image to determine the at least one ROI in the scanned image.

According to various embodiments, the method may further include extracting image data from the at least one ROI of the scanned image and generating statistical data from the extracted image data to analyse the image data of the at least one ROI.

According to various embodiments, a non-transitory computer readable storage medium is provided. The non-transitory computer readable storage medium includes instructions, wherein the instructions, when executed by a processor in a system, cause the system to receive a scanned image of the test piece from the scanner, display the scanned image, generate a first score value based on the scanned image, display a scoring input interface configured to receiving user input, and receive a second score value via the scoring input interface, wherein the first score value and the second score value are utilized to evaluate the scan quality of the scanner.

According to various embodiments, a testing system comprising a system as described above and a test piece for evaluating the scan quality of a scanner is provided.

According to various embodiments, the test piece may include a plurality of test panels spaced apart from each other along a longitudinal axis, wherein each of the plurality of test panels is perpendicular to the longitudinal axis.

According to various embodiments, the test piece may include a base panel comprising a first plurality of test elements and a longitudinal axis, a rotatable panel comprising a second plurality of test elements and pivotally connected to the base panel along the longitudinal axis, wherein the rotatable panel is rotatable about the longitudinal axis.

BRIEF DESCRIPTION OF DRAWINGS

FIG. 4A shows an exemplary embodiment of the user evaluation interface for a test piece.

FIG. 6A shows the top view of the third test panel in FIG. 6.

FIG. 6B shows an elevation view of the third test panel in FIG. 6.

FIG. 6C shows a schematic diagram of the top view of a section of the third test panel.

FIG. 6D shows an exemplary example of a matrix for calculating the first score value and second score value of the third test panel.

FIG. 6E shows an exemplary embodiment of the user evaluation interface for a test piece.

FIG. 9B shows an exemplary embodiment of the user evaluation interface for a test piece.

FIG. 10 shows a perspective view of an exemplary embodiment of a seventh test panel of the plurality of test panels.

FIG. 10A and FIG. 10B show top views of the upper base panel and lower base panel of the base in FIG. 10.

FIG. 10C shows an exemplary embodiment of the user evaluation interface for a test piece.

FIG. 10D shows an exemplary embodiment of the overall score summary table.

FIG. 17B shows an exemplary embodiment of the user evaluation interface for a test piece.

FIG. 17C shows of a matrix for calculating the first score value and second score value of the fifth test element.

FIG. 18C shows an exemplary embodiment of the user evaluation interface for a test piece.

FIG. 18D shows of a matrix for calculating the first score value and second score value of the fifth test element.

FIG. 19 shows an exemplary embodiment of the overall score summary table.

DETAILED DESCRIPTION

In the following examples, reference will be made to the figures, in which identical features are designated with like numerals.

Figure 1:
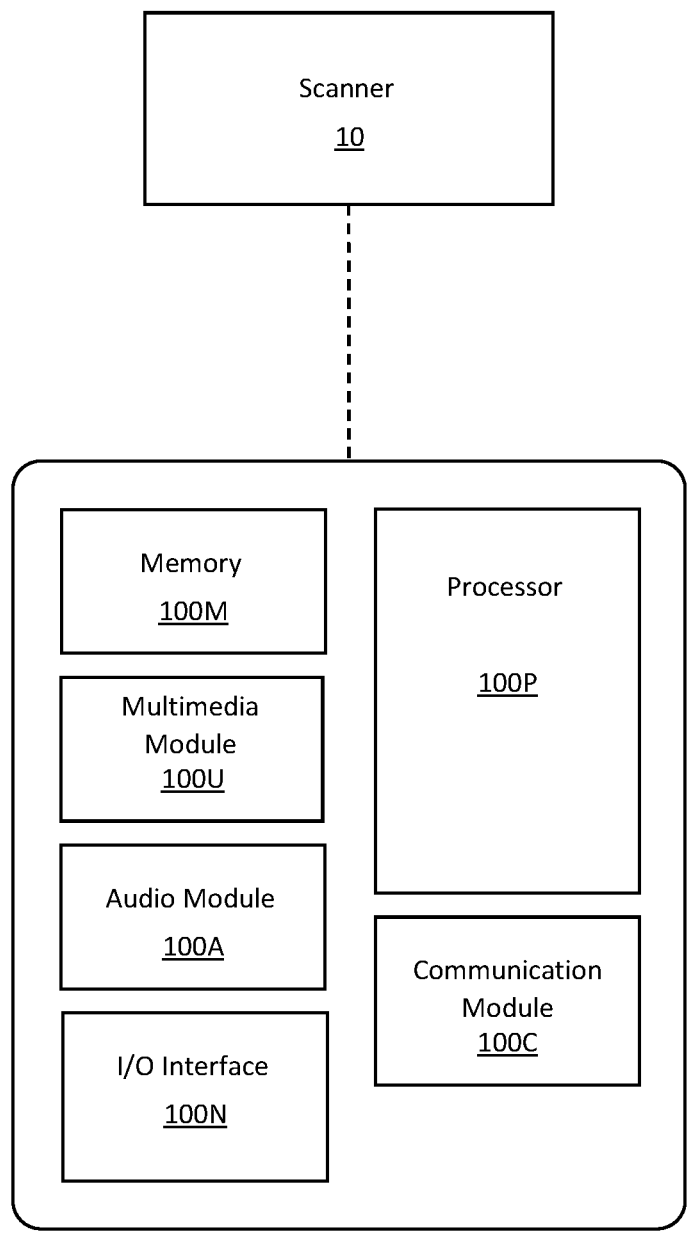
FIG. 1 shows an exemplary embodiment of a system for evaluating the scan quality of a scanner on a test piece.

FIG. 1 shows an exemplary embodiment of a system 100 for evaluating the scan quality of a scanner 10 on a test piece. System 100 may be configured to communicate with the scanner 10. System 100 may include a processor 100P and a memory 100M in communication to the processor 100P for storing instructions executable by the processor 100P. Processor 100P is configured to receive a scanned image of the test piece from the scanner 10, display the scanned image, generate a first score value based on the scanned image, display an evaluation input interface configured to receive user evaluation input based on the evaluation of the scanned image, and generate a second score value based on the user evaluation input, such that the first score value and the second score value are utilized to evaluate the scan quality of the scanner 10. Processor 100P may be configured to determine the scan quality of the scanner based on the first score value and the second score value. System 100 may be used for evaluating the scan quality of different types of scanners, e.g. CT scanner, X-ray scanner including linear X-ray scanner, backscatter X-ray scanner, etc.

System 100 may include at least one of a multimedia module 100U configured to display the scanned image and the scoring input interface and receive user input, an audio module 100A configured to input/output audio signals, an input/output (I/O) interface 100N configured to provide an interface between the processor 100P and peripheral interface modules, e.g. keyboard, and a communication module 100C configured to facilitate communication between the system 100 and other devices or server. System 100 may include a storage module, e.g. a database, cloud server, configured to store data.

System 100 enables both objective evaluation and subjective evaluation to be conducted on the scanned image. Based on the scanned image, the system 100 is able to automatically generate a first score value based on the quality of the scanned image on at least one aspects of the test, e.g. spatial resolution. At the same time, the scanned image is being displayed on multimedia module 100U for the user to view and, based on the user's evaluation of the quality of the scanned image, the user inputs the user evaluation input data into the evaluation input interface by entering the input data into the system via the multimedia module 100U or the I/O interface. System 100 may then generate the second score value from the user evaluation input data. System 100 may then obtain both an objective first score value generated by the system 100 and a subjective second score value by the user. Both the first score value and the second score value may be used to evaluate the scan quality of the scanner 10. System 100 may retrieve a pre-determine first threshold score value and a pre-determined second threshold score value from the storage module and compare them to the first score value and the second score value respectively. If the first score value is lower than the first threshold score value or the second score value is lower than the second threshold score value, the system 100 may generate and transmit a failed signal to the user via a user device, e.g. tablet, laptop, or the multimedia module 100U. System 100 may generate an alarm via the audio module 100A. System 100 may compute both the first score value and the second score value and generate an overall score value. System 100 may retrieve a pre-determined overall threshold score value and compare it with the overall score value. If the overall score value is lower than the overall threshold score value, the system 100 may generate and transmit a failed signal to the user via a user device or the multimedia module 100U. System 100 may generate an alarm via the audio module 100A. System 100 may store the pre-determined overall threshold score value, first threshold score value, second threshold score value in the storage module.

Figure 2:
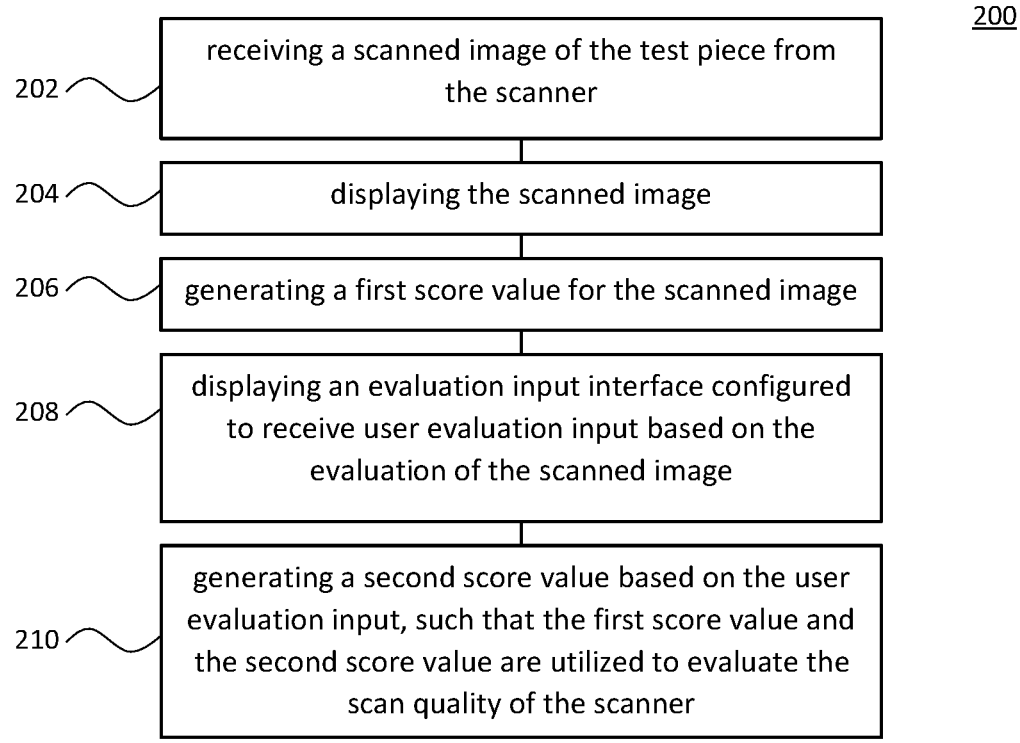
FIG. 2 shows a flow diagram of a computer-implemented method for evaluating the scan quality of the scanner on a test piece.

FIG. 2 shows a flow diagram of a computer-implemented method for evaluating the scan quality of the scanner 10 on a test piece. Method includes receiving a scanned image of the test piece from the scanner 10 in block 202, displaying the scanned image in block 204, generating a first score value for the scanned image in block 206, displaying an evaluation input interface configured to receive user evaluation input based on the evaluation of the scanned image in block 208, and generating a second score value based on the user evaluation input in block 210, such that the first score value and the second score value are utilized to evaluate the scan quality of the scanner 10.

To obtain an objective score of the scanned image, the system 100 may be configured to carry out the following method. When a scanned image of the test piece is received by the processor 100P, the processor 100P may be configured to determine at least one region of interest (ROI) in the scanned image and analyse the at least one ROI to generate the first score value. The at least one ROI is determined based on the test piece. System 100 may be configured to retrieve a template with the at least one pre-determined ROI to determine the at least one ROI in the scanned image. System 100 may be configured to store a plurality of templates with the at least one pre-determined ROI in the storage module. Processor 100P may retrieve a template with the at least one pre-determined ROI and map the template onto the scanned image to determine the at least one ROI in the scanned image. Processor 100P may be configured to transform the template to map it to the scanned image. By transforming the template, the processor 100P may rotate, translate and/or scale the template to the scanned image. To map the template to the scanned image, the processor 100P may perform techniques including pattern matching, least squares fit minimisation, etc. Once the transformation is performed, the processor 100P may be configured to use the transformation factors, e.g. rotation, translation and/or scaling factors, to map the at least one ROI in the template onto the scanned image to determine the at least one ROI in the scanned image.

Once the at least one ROI in the scanned image is determined, the processor 100P may be configured to extract image data from the at least one ROI of scanned image and generate statistical data from the extracted image data to analyse the image data of the at least one ROI. Processor 100P may be configured to calculate a parameter, e.g. set of statistical properties including mean value and standard deviation from the individual pixel or voxel values contained within each of the at least one ROI in the scanned image. From the parameters, the processor 100P may calculate quantities used to characterize the scan quality, e.g. contrast, uniformity, feature detection, etc. of the scanner 10. For example, the processor 100P may calculate a figure of merit between the statistical properties of the at least one ROI. Processor 100P may generate a score value based on the parameter for each of the at least one ROI. For example, the processor 100P may return a binary value, e.g. true or false, yes or no, of the scan quality and assign a score value if the binary value is true. System 100 may store scoring tables in the storage module. Scoring table may include the plurality of ROIs and the corresponding score values, with the binary value for each of the at least one ROI for generating the score value. System 100 may retrieve the scoring table for the test piece to retrieve the score value for each of the plurality of ROIs. Processor 100P may assign the score value for each of the at least one ROI using the scoring table. Processor 100P may aggregate the score values for the at least one ROI to generate the first score value.

To obtain a subjective score of the scanned image, the system 100 may be configured to carry out the following method. Processor 100P may display the scanned image on the multimedia module, e.g. display, touchscreen, for the user to view. Processor 100P may display the user evaluation interface on the multimedia module for the user to view. System 100 may store the evaluation input interface in the storage module. Evaluation input interface may include the scoring table. An example of the user evaluation interface may be shown in FIG. 4A. Processor 100P may display a schematic diagram of the test piece with the at least one ROI so that the user is able to identify the at least one ROI and input the binary value for each of the at least one ROI via the multimedia module or I/O interface, e.g. keyboard. If a feature in the ROI of the scanned image is visible, the uses may enter "yes" in the user evaluation interface. Otherwise, the user may enter "no". Processor 100P may receive the binary value for each of the at least one ROI and assign the score value for each of the at least one ROI based on the scoring table. Alternatively, the user may enter a score value directly into the user evaluation interface using a matrix. Processor 100P may receive the score values and aggregate the score values for the at least one ROI to generate the second score value. Score values may be weighted such that designed ROIs that are more difficult to identify may be higher. Storing the first score and the second score of the scanned images in the server. Storing the analysed results of the scanned image in the server. The stored data may be stored to form historical data for future analysis.

The scanned image may be converted into a unified format with pre-determined image co-ordinates and data types. In this way, the scanned images of various formats, e.g. from various types of scanner 10s, may be standardised into a single format.

FIG. 1 shows a testing system which may include the system 100 and the test piece as described below.

Figure 3:
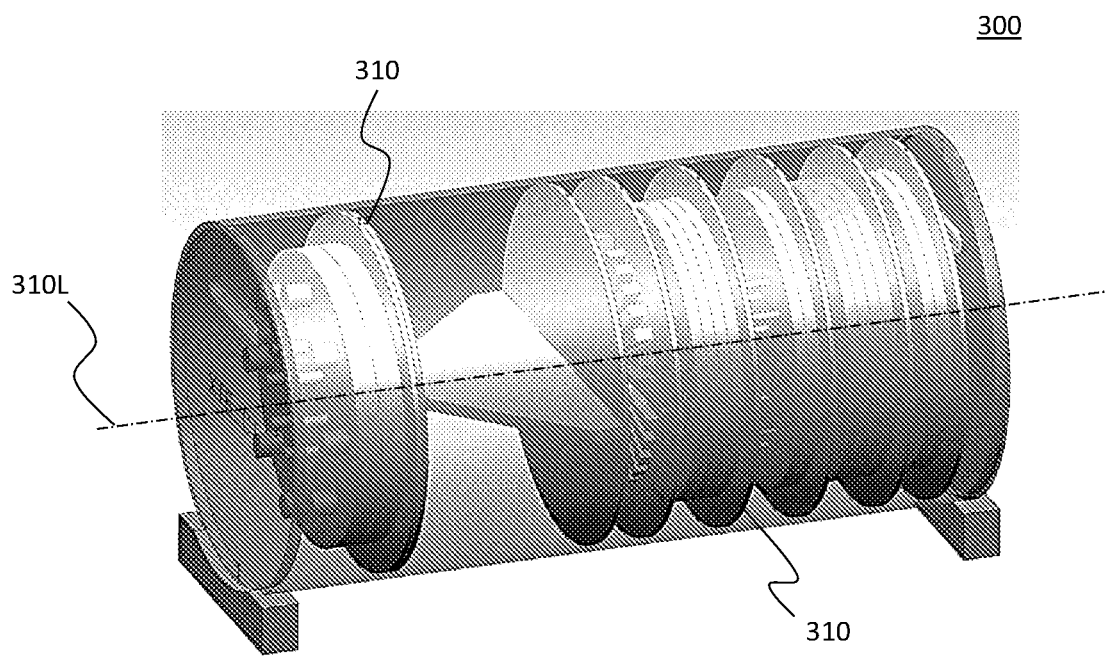
FIG. 3 shows a perspective view of an exemplary embodiment of the test piece for testing the scan quality of a scanner.

FIG. 3 shows a perspective view of an exemplary embodiment of the test piece 300 for testing the scan quality of a scanner 10. Test piece 300 may be suitable for CT scanners. Test piece 300 may be optimised for CT image quality analysis. Scanner 10 may have a field of view in the range of 100 mm×100 mm to 2000 mm×2000 mm. Scanner 10 may have a helical scan system 100 with a scanning speed in the range of 0.01 m/s to 10.00 m/s. Scanned image may have an image resolution in the range of 0.5 mm to 10.0 mm reconstructed voxel. Test piece 300 may include a plurality of test panels 310. Plurality of test panels 310 may be spaced apart from each other along a longitudinal axis 300L. Each of the plurality of test panels 310 may form an angle with the longitudinal axis 300L. Plurality of test panels 310 may be perpendicular to the longitudinal axis 300L such that the plurality of test panels 310 may be parallel to each other. Longitudinal axis 300L may pass through each of the plurality of test panels 310. Each of the plurality of test panels 310 may include a central axis. Longitudinal axis 300L may pass through the centre of each of the plurality of test panels 310. Central axis of each of the plurality of test panels 310 may be parallel to the longitudinal axis 300L. Each of the plurality of test panels 310 may have a circular profile. When the plurality of test panels 310 are arranged parallelly along the longitudinal axis 300L, the plurality of test panels 310 may form a tubular profile. Test piece 300 may include a tubular housing adapted to house the plurality of test panels 310. Test piece 300 may be 600 mm long and 300 mm wide.

Figure 3A:
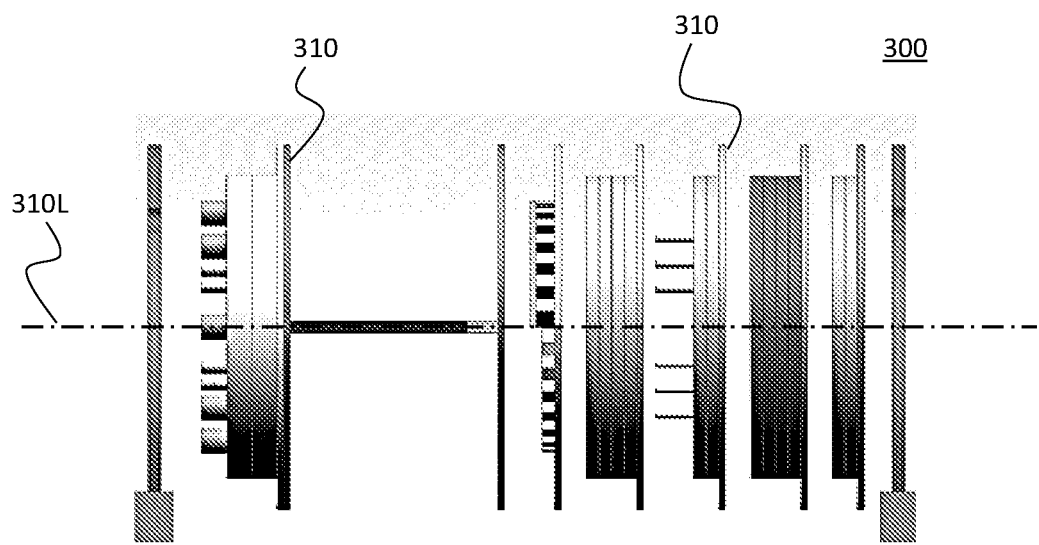
FIG. 3A shows an elevation view of the test piece in FIG. 3.
Figure 3B:
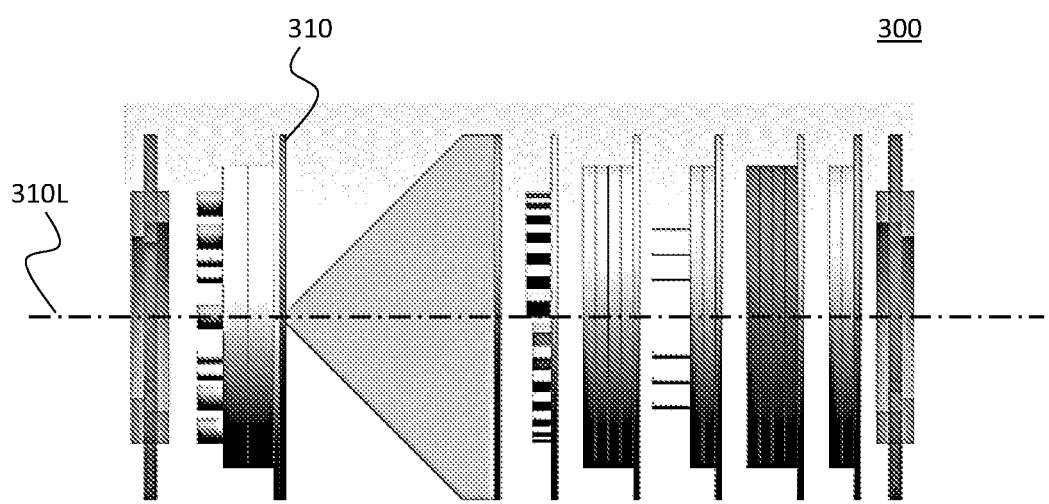
FIG. 3B shows a top view of the test piece in FIG. 3.

FIG. 3A shows an elevation view of the test piece 300 in FIG. 3. FIG. 3B shows a top view of the test piece 300 in FIG. 3. As shown in FIG. 3A and FIG. 3B, the plurality of test panels 310 may be parallel to each other. Each of the plurality of test panels 310 may be designed to test for a specific scan quality of the scanner 10. Referring to FIG. 3B, the present embodiment of the test piece 300 may include seven test panels 310. Test piece 300 may include at least one of the seven test panels 310 in any combination or other test panels 310 where necessary. Test piece 300, having the plurality of test panels 310, allows multiple tests to be conducted in a single scan.

Figure 4:
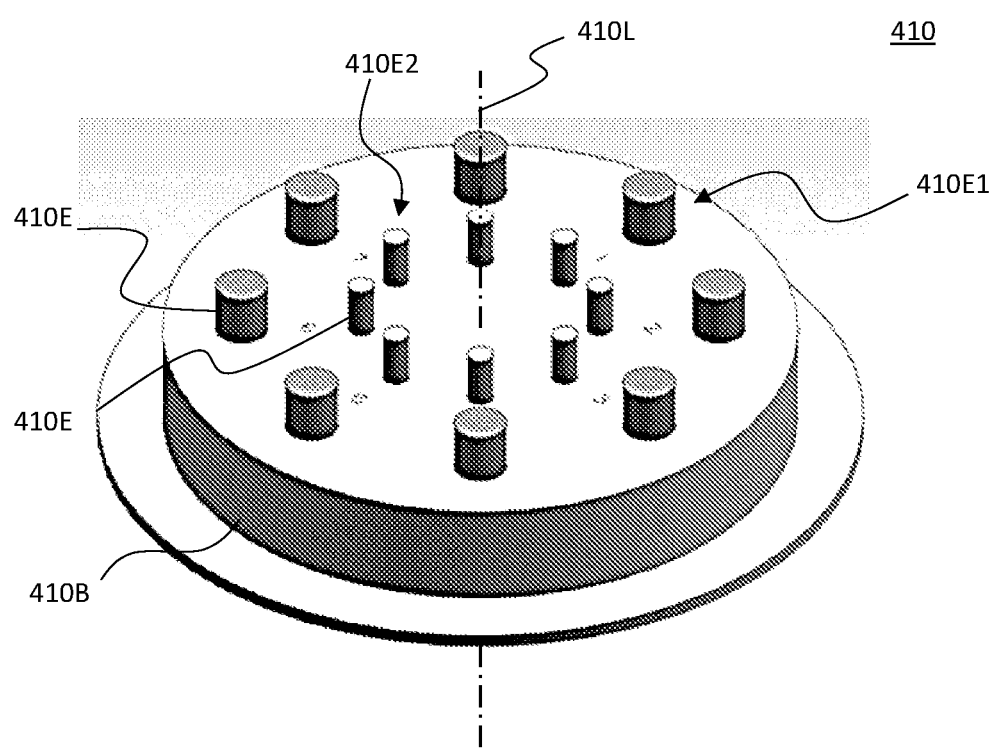
FIG. 4 shows a perspective view of an exemplary embodiment of a first test panel of the plurality of test panels.

FIG. 4 shows a perspective view of an exemplary embodiment of a first test panel 410 of the plurality of test panels 310. First test panel 410 may be suitable for testing the contrast, effective nuclear charge ($Z_{effective}$), and density resolution of the scanner 10. First test panel 410 may include a base 410B with a top side 410BT and a bottom side 410BB opposite the top side 410BT. Base 410B may be mounted to a base plate 410P. Base 410B may include a plurality of elongated elements 410E extending from within the base 410B and out thereof. Plurality of elongated elements 410E may be parallel to the central axis 410 of the first test panel 410. Plurality of elongated elements 410E may be of the same or different length. Plurality of elongated elements 410E may be made of different materials so that the plurality of elongated elements 410E are of different densities. The materials of the plurality of elongated elements 410E may be selected from a range of densities in the organic range so that the scan quality and sensitivity of the scanner 10 in that range may be tested. For example, the materials may include polypropylene, polyamide 12 or polypropylene 10% glass, polypropylene 30% glass, peek, acetal homopolymer (e.g. Delrin™), chlorinated PVC, polyvinylidene fluoride, polytetrafluoroethylene (e.g. Teflon™). Base 410B may be made of acrylic (e.g. Perspex™). Base 410B may be used as a scattering base for scattering the electronic waves emitted by the scanner 10. Plurality of elongated elements 410E may be divided into a plurality of groups of elongated elements 410E. Referring to FIG. 4, there may be two groups of elongated elements. The width of the elongated elements 410E in one group may be different from the width of the elongated elements 410E in another group. Referring to FIG. 4, a first group of elongated elements 410E1 may be wider than a second group of elongated elements 410E2. First group of elongated elements 410E1 may be disposed in a concentric configuration forming a ring around the central axis 410 and equally spaced apart from each other. Second group of elongated elements 410E2 may be disposed in a concentric configuration forming a ring around the central axis 410 and equally spaced apart from each other. Second group of elongated elements 410E2 may be disposed within the first group of elongated elements 410E1. Plurality of elongated elements 410E may be rods. Base 410B may be circular, square or any suitable shapes. First test panel 410 enables the user to view the visibility of the elongated elements 410E in air, i.e. extending from the base 410B, and within a scattering material, i.e. in the base 410B.

FIG. 4A shows an exemplary embodiment of the user evaluation interface 412 for a test piece 300. User evaluation interface 412 may be a scoring table may be the scoring table for the first test panel 410. Scoring table may include a plurality of ROIs, e.g. Step 1, Step 2, etc, and the score value, e.g. points, for each of the plurality of ROIs. Processor 100P may receive the scanned image of the first test panel 410 and evaluate the scanned image. For the objective evaluation, a template for the first test panel 410 may be retrieved by the processor 100P and mapped it onto the scanned image of the first test panel 410. A plurality of ROIs of the scanned image may be determined based on the template. For example, if an elongated element of the first group of elongated elements 410E1 is 20 mm in diameter, a ROI may be a circle of 16 mm radius, which includes the elongated element, may be determined. Voxels or pixel that are wholly contained within the ROI may be extracted for the analysis. For example, the parameters, e.g. mean value and standard deviation of the pixels within the ROI may be calculated. A separate ROI of the same area may be calculated at the centre of the scanned image within the base 410B. Steps may be considered distinguishable if the separation between mean value between two steps in air is more than one standard deviation. Steps may be considered distinguishable in the base 410B if the mean value between a step and the base 410B mean value is greater than one standard deviation. Processor 100P may assign the corresponding score value to the ROI based on the scoring table. Once the scoring table is completed, the system 100 may generate the first score value and the second score value for each performance characteristic of the scanner 10, i.e. contrast, $Z_{effective}$, and density resolution to evaluate the scan quality of the scanner 10.

For the subjective evaluation, the user may be prompted by the system 100 via the multimedia module 100U to distinguish the grey level between the different materials of the plurality of elongated elements 410E in air and in the base 410B. For example, referring to FIG. 4, if the user is able to identify a discernible contrast between Step 1 (indicated as 1 on the base 410B) and Step 2 (indicated as 2 on the base 410B) in the scanned image, the user may input "yes" in "Step 1" under "Subjective, Air" via the multimedia module 100U and/or I/O interface 100N. Accordingly, the user may input "no" if Step 1 is not discernible from Step 2. The same steps may be taken for Steps 1-8 in air and in the base 410B.

Figure 5:
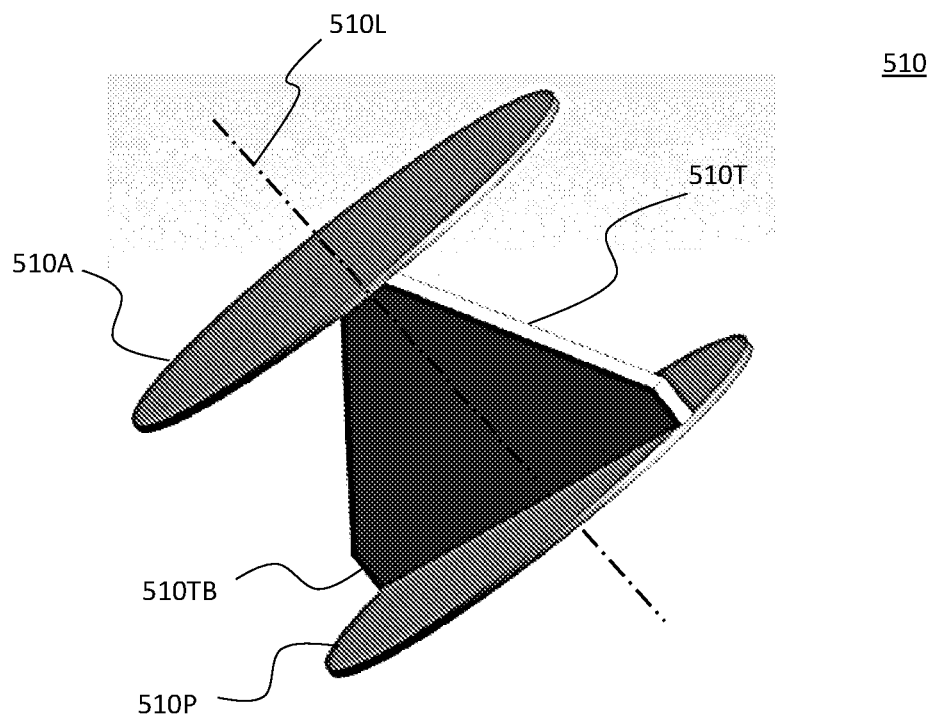
FIG. 5 shows a perspective view of an exemplary embodiment of a second test panel of the plurality of test panels.

FIG. 5 shows a perspective view of an exemplary embodiment of a second test panel 510 of the plurality of test panels 310. Second test panel 510 may be suitable for testing the extent of beam hardening effect on the scanner 10. Second test panel 510 may include a triangular plate 510T having a base portion 510TB and an apex (not shown in FIG. 5) opposite the base. Base portion 510TB and apex may be along a central axis 510L. Second test panel 510 may include a base plate 510P and a top plate 510A spaced from the base plate 510P. Triangular plate 510T may extend from the base plate 510P to the top plate 510A along the central axis 510L. Triangular plate 510T may be made of acrylic.

Figure 5A:
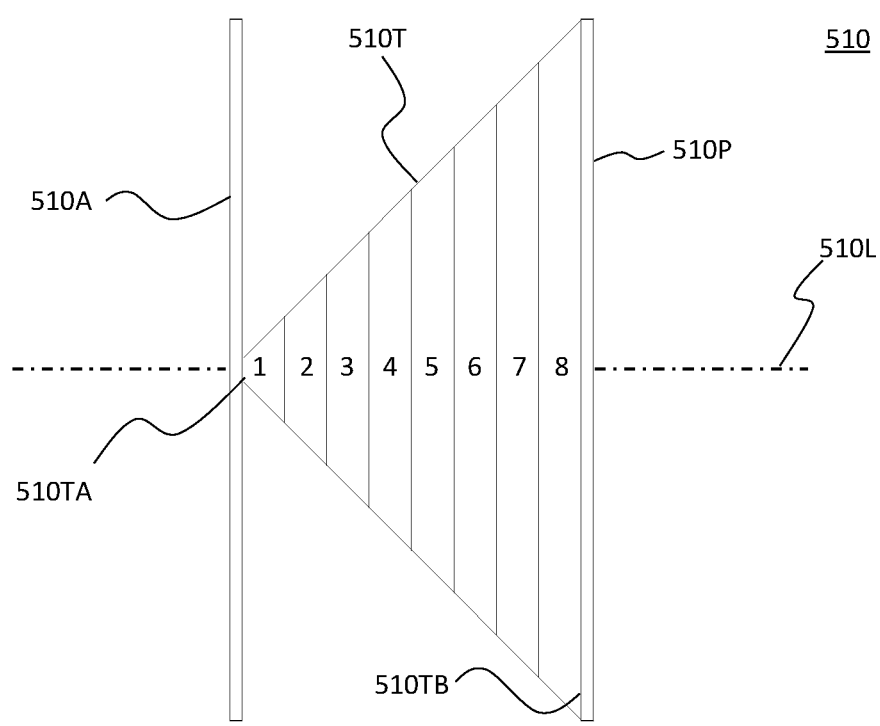
FIG. 5A shows a schematic diagram of the top view of the second test panel in FIG. 5.

FIG. 5A shows a schematic diagram of the top view of the second test panel 510 in FIG. 5. As shown in FIG. 5A, the triangular plate 510T may extend from the base plate 510P to the top plate 510A such that the base portion 510TB of the triangular plate 510T connects to the base plate 510P and the apex connects to the top plate 510A. FIG. 5A also shows a schematic diagram of the second test panel 510 with the at least one ROI. For example, there may be eight ROIs, i.e. Test Region 1-8, for the second test piece 300.

Figures 5B, 6:
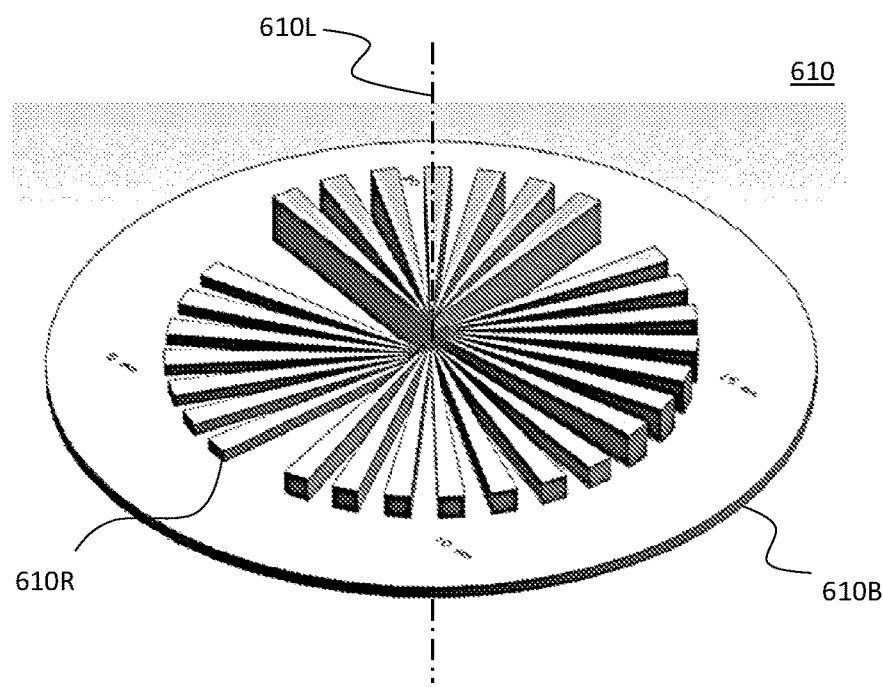
FIG. 5B shows an exemplary embodiment of the user evaluation interface for a test piece.
FIG. 6 shows a perspective view of an exemplary embodiment of a third test panel of the plurality of test panels.

FIG. 5B shows an exemplary embodiment of the user evaluation interface 512 for the test piece 300. User evaluation interface 512 may include the scoring table for the second test panel 510. Scoring table may include a plurality of ROIs, e.g. Test Region 1 and 2, Test Region 3 and 4, etc, that corresponds to the schematic diagram and the corresponding score value, e.g. points, for each of the plurality of ROIs. Processor 100P may receive the scanned image of the second test panel 510 and evaluate the scanned image. For the objective evaluation, the processor 100P may retrieve the template for the second test panel 510 and mapped it onto the scanned image of the second test panel 510. A plurality of ROIs of the scanned image may be determined based on the template. For example, the triangular plate 510T may be divided into 8 strips of ROIs. Processor 100P may extract the voxels or pixels in each of the plurality of ROIs. System 100 may calculate the parameters for each of the plurality of ROIs. For example, if the variance is less than a predetermine number of times, e.g. 2×, of the mean value, then the processor 110P may assign the corresponding score value to the ROI according to the scoring table.

For the subjective evaluation, the user may be prompted by the system 100 via the multimedia module 100U to identify whether there is any variation in the colour of each ROI. For example, referring to FIG. 5A, a uniform coloured second test panel 510, i.e. triangle, would indicate that the scan quality of the scanner 10 is acceptable. If the user is able to identify a uniform colour in an ROI, e.g. Test Region 1 and 2, in the scanned image, the user may input "yes" in "Test Region 1 and 2" via the multimedia module 100U and/or I/O interface 100N. Accordingly, the user may input "no" if there is colour variation in the ROI. The same steps may be taken for Test Regions 1-8. Once the scoring table is completed, the system 100 may generate the first score value and the second score value for each performance characteristic of the scanner 10, i.e. beam hardening effect, to evaluate the scan quality of the scanner 10.

FIG. 6 shows a perspective view of an exemplary embodiment of a third test panel 610 of the plurality of test panels 310. Third test panel 610 may be suitable for testing the spatial resolution of the scanner 10. Third test panel 610 may include a base plate 610P, a central axis 610L perpendicular to the base plate 610P and a plurality of elongated ridges 610R extending along the base plate 610P. Plurality of ridges 610R may be spaced apart from each other. Plurality of ridges 610R may have different heights with a value ranging from 5 mm to 20 mm. Height of the plurality of ridges 610R may be in intervals, e.g. 5 mm, 10 mm, 15 mm, 20 mm. Plurality of ridges 610R may be arranged sequentially from the tallest to the shortest. Plurality of ridges 610R may be segregated into a plurality of groups of ridges 610R. The ridges 610R in each of the plurality of groups of ridges 610R may have the same height. The height of the ridges 610R in one of the plurality of groups of ridges 610R may differ from the height of the ridges 610R in another one of the plurality of groups of ridges 610R. Each of the plurality of ridges 610R may be wedged shaped from the top view and having a tip. Plurality of the ridges 610R may be arranged such that the tips of the plurality of ridges 610R converge at the central axis 610L.

FIG. 6A shows the top view of the third test panel 610 in FIG. 6. Plurality of ridges 610R may extend outwardly from the central axis 610L and spaced apart from each other. As shown in FIG. 6A, a first group of ridges 610R1 may be 5 mm high, a second group of ridges 610R2 spaced from the first group of ridges may be 10 mm high, a third group of ridges 610R3 spaced from the second group of ridges be 15 mm high, a fourth group of ridges 610R4 spaced from the third group of ridges be 20 mm high. From the top view, the plurality of ridges 610R radiates from the central axis 610L of the base plate 610P.

FIG. 6B shows an elevation view of the third test panel 610 in FIG. 6. As shown in FIG. 6B, the plurality of ridges 610R may be of different heights extending from the base plate 610P. Fourth group of ridges 610R4 may be taller than the third group of ridges 610R3, which may be taller than the second group of ridges 610R2, which may be taller than the first group of ridges 610R1.

FIG. 6C shows a schematic diagram of the top view of a section of the third test panel 610. FIG. 6C shows the section with a plurality of the ridges 610R of a height. System 100 is configured to identify the point at which the plurality of ridges 610R for each height is no longer distinguishable. For example, as shown in FIG. 6C, if the point at which the plurality of ridges 610R are no longer distinguishable is denoted by L2 from the edge of the plurality of ridges 610R, L1, which is the non-distinguishable region may be calculated by subtracting the length of the plurality of ridges 610R by L2.

FIG. 6D shows an exemplary example of a matrix 612M for calculating the first score value and the second score value of the third test panel 610. System 100 may include a matrix 612M for test panels with more than one dimension. For example, the third test panel 610 may have a first dimension of the height of the plurality of ridges 610R and a second dimension of the width of the plurality of ridges 610R. Matrix 612M may include both dimensions and corresponding score values for the dimensions. As shown in the matrix 612M, the score value for the smallest resolution, e.g. 1 mm, may have the highest weight or score value.

FIG. 6E shows an exemplary embodiment of the user evaluation interface 612 for a test piece 300. User evaluation interface 612 may be the scoring table for the third test panel 610. Scoring table may include a plurality of ROIs, e.g. 5 mm Test Region, 10 mm Test Region, etc, and the empty fields for the user to enter the measured length L2 for each of the plurality of ROIs. Processor 100P may receive the scanned image of the third test panel 610 and evaluate the scanned image. For the objective evaluation, a template for the third test panel 610 may be retrieved by the processor 100P and mapped it onto the scanned image of the third test panel 610. Processor 100P may identify a plurality of ROIs based on the template for the third test panel 610. For example, the processor 100P may define a set of rings at 5 mm interval from the central axis 610L of the test region shown in FIG. 6C outwards to the edge of the section of the plurality of ridges 610R. For each ring, the processor 100P may be configured to extract the voxels or pixels and calculate the maximum and minimum value of the voxels or pixels around the ring. If the minimum value of the voxels or pixels is below a threshold, e.g. 20%, of the maximum value, the processor 100P may identify the ring to be "visible". Processor 100P may determine the "visible" ring with the smallest diameter to be the resolution limit for the section. The same calculation may be performed for each section of plurality of ridges 610R of other heights. For the subjective evaluation, the user may be prompted by the system 100 via the multimedia module 100U to identify the width of the plurality of ridges 610R in each section that is distinguishable from each other. For example, referring to FIGS. 6C and 6D, If the user is able to identify the width for the test region of 5 mm is 3 mm, the user may input the assigned score value via the multimedia module 100U and/or I/O interface 100N. Processor 100P may assign a corresponding score value based on the matrix 612M to the ROI. The same steps may be taken for the other section of plurality of ridges 610R of different heights. Once the scoring table is completed, the system 100 may generate the first score value and the second score value for each performance characteristic of the scanner 10, i.e. spatial resolution, to evaluate the scan quality of the scanner 10.

Figure 7:
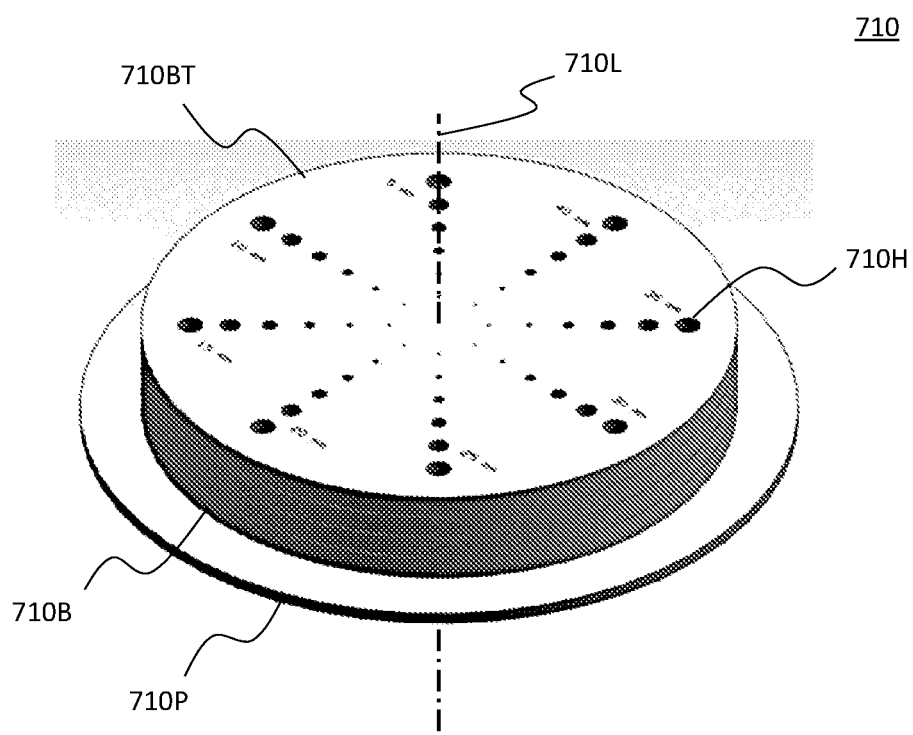
FIG. 7 shows a perspective view of an exemplary embodiment of a fourth test panel of the plurality of test panels.

FIG. 7 shows a perspective view of an exemplary embodiment of a fourth test panel 710 of the plurality of test panels 310. Fourth test panel 710 may be suitable for testing the contrast resolution of the scanner 10. Fourth test panel 710 may be suitable to test the spatial resolution of the scanner 10 as well. Fourth test panel 710 may be suitable for validating the performance of spatial and contrast resolution as a function of reconstructed CT slice thickness. Fourth test panel 710 may include a base 710B having a top side 710BT and a bottom side (not shown in FIG. 7) opposite the top side 710BT and a central axis 710L extending through the top side 710BT and the bottom side. Fourth test panel 710 may include a plurality of holes 710H extending from the top side 710BT towards the bottom side and parallel to the central axis 710L. Plurality of holes 710H may have different depths and width. Plurality of holes 710H may have depths of values in a range of 5 mm to 40 mm. Plurality of holes 710H may have width of value in the range of 1 mm to 10 mm. Base 710B may be attached to a base plate 610P.

Figure 7A:
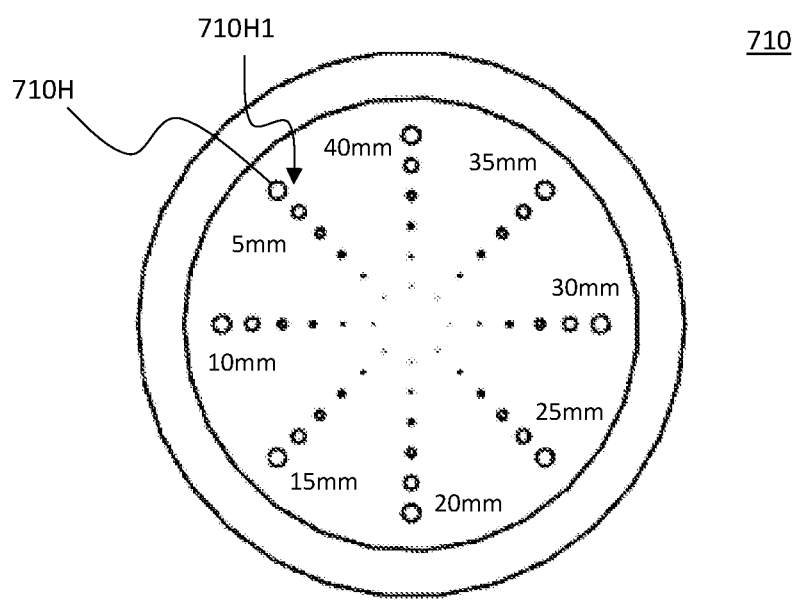
FIG. 7A shows a top view of the fourth test panel in FIG. 7.

FIG. 7A shows a top view of the fourth test panel 710 in FIG. 7. Plurality of holes 710H may be segregated into a plurality of groups of holes 710H1. Each of the plurality of groups 710H1 may include holes 710H of increasing widths. For example, each group of holes 710H1 may include holes 710H of widths of 1 mm, 2 mm, 4 mm, 6 mm, 8 mm, and 10 mm. The depth of each group of holes 710H1 may be different from another. For example, the depths of the plurality of groups of holes 710H1 may include 5 mm, 10 mm, 15 mm, 20 mm, 25 mm, 30 mm, 35 mm, 40 mm. Each of the plurality of groups of holes 710H1 may be disposed in a straight line with the holes 710H arranged from the deepest hole to the shallowest hole. Each of the plurality of groups of holes 710H1 may be lined radially from the central axis 710L. Base 710B may be circular, square or any suitable shapes. Plurality of holes 710H may be circular.

Figures 7B, 7C:
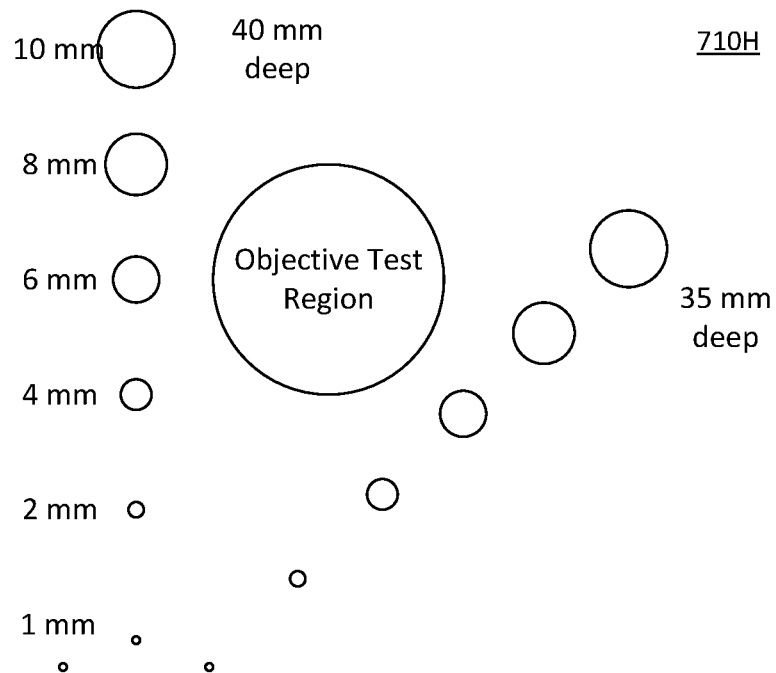
FIG. 7B shows a schematic diagram of a section of the plurality of holes in FIG. 7 and an ROI.
FIG. 7C shows an exemplary embodiment of the user evaluation interface for a test piece.

FIG. 7B shows a schematic diagram of a section of the plurality of holes 710H in FIG. 7 and an ROI. For the objective evaluation, when the scanned image of the second test piece 300 is received, the system 100 may identify a plurality of ROIs based on the template for the fourth test panel 710. System 100 may identify each hole location as an ROI. System 100 may generate the parameter for each of the plurality of ROIs. For example, referring to FIG. 7B, the processor 100P may identify the plurality of hole locations and a background region, e.g. 30 mm diameter circle, between the any two groups of holes 710H as the ROIs. Processor 100P may calculate the mean value of the voxels or pixels within each ROI or hole and the standard deviation of the background region and compare both values. Processor 100P may assign the hole as "visible" if the mean value of the hole is at least 2 standard deviations different from the mean value of the test region.

FIG. 7C shows an exemplary embodiment of the user evaluation interface 712 for a test piece 300. User evaluation interface 712 may be the scoring table for the fourth test panel 710. Scoring table 712 may include the widths of the holes 710H and the score values assigned for each hole 710H. As shown in FIG. 7C, the score values may be weighted such that the holes 710H with smaller widths may be assigned higher score values. Processor may receive the scanned image of the fourth test panel 710 and evaluate the scanned image. For the objective evaluation, a template for the fourth test panel 710 may be retrieved by the processor 100P and mapped it onto the scanned image of the fourth test panel 710. A plurality of ROIs of the scanned image may be determined based on the template. For example, each of the holes may be an ROI and the background area between the plurality of groups of holes may be an ROI. Voxels or pixel that are wholly contained within the ROI may be extracted for the analysis. For example, the parameters, e.g. mean value and standard deviation of the pixels within the holes may be calculated and compared to the standard deviation of the background area. Processor 100P may determine that the hole is "visible" if the mean value of the hole is at least 2 standard deviation different from the mean value of the background area. Processor 100P may assign the corresponding score value to the ROI based on the scoring table. For the subjective evaluation, the user may be prompted by the system 100 via the multimedia module 100U to identify the number of holes 710H of each width that can be seen in the scanned image. User may input the number of holes in the scoring table via the multimedia module 100U or I/O interface 100N and processor 100P may assign the corresponding score value based on the scoring table. Once the scoring table is completed, the system 100 may generate the first score value and the second score value for each performance characteristic of the scanner 10, i.e. contrast resolution, to evaluate the scan quality of the scanner 10.

Figure 8:
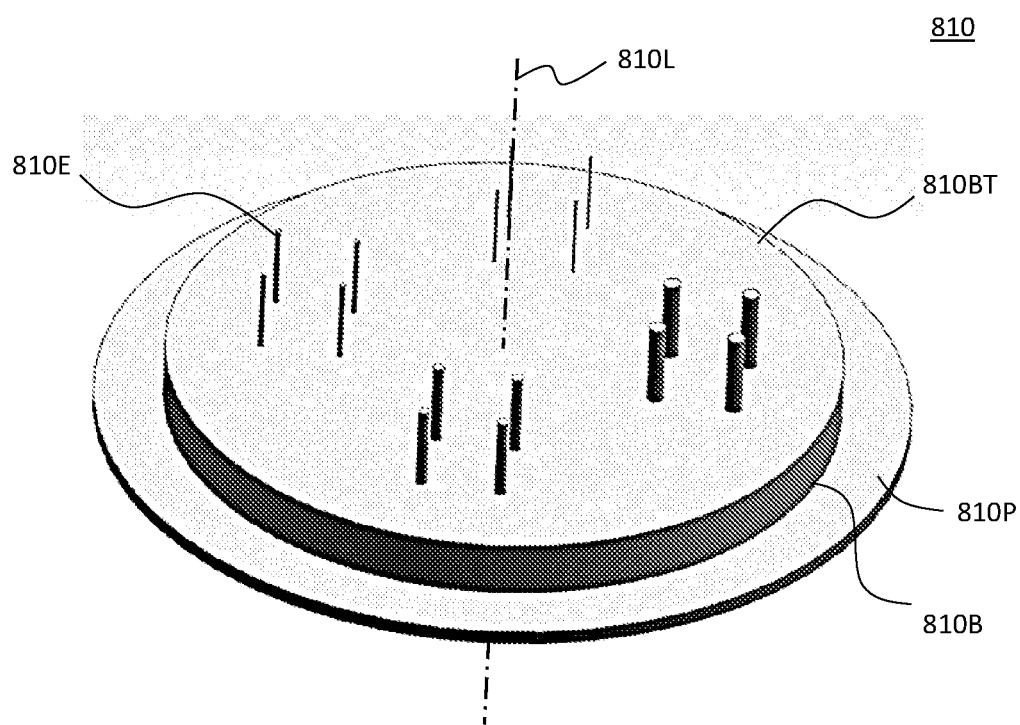
FIG. 8 shows a perspective view of an exemplary embodiment of a fifth test panel of the plurality of test panels.

FIG. 8 shows a perspective view of an exemplary embodiment of a fifth test panel 810 of the plurality of test panels 310. Fifth test panel 810 may be suitable for testing sensitivity of the scanner 10 to metal artefacts. Fifth test panel 810 may include a base 810B with a top side 810BT and a bottom side (not shown in FIG. 8) opposite the top side 810BT and a central axis 810L through the top side 810BT and the bottom side. Base 810B may be mounted to a base plate 810P. Base 810B may include a plurality of elongated elements 810E extending from within the base 810B and out thereof. Plurality of elongated elements 810E may be parallel to the central axis 810L. Plurality of elongated elements 810E may be of the same length. Plurality of elongated elements 810E may be of different widths. The width of the plurality of elongated elements 810E may be in the range of 1 mm to 6 mm. Plurality of elongated elements 810E may be divided into a plurality of groups of elongated elements 810E. The width of the elongated elements 810E in one group may be different from the width of the elongated elements 810E in another group.

Figure 8A:
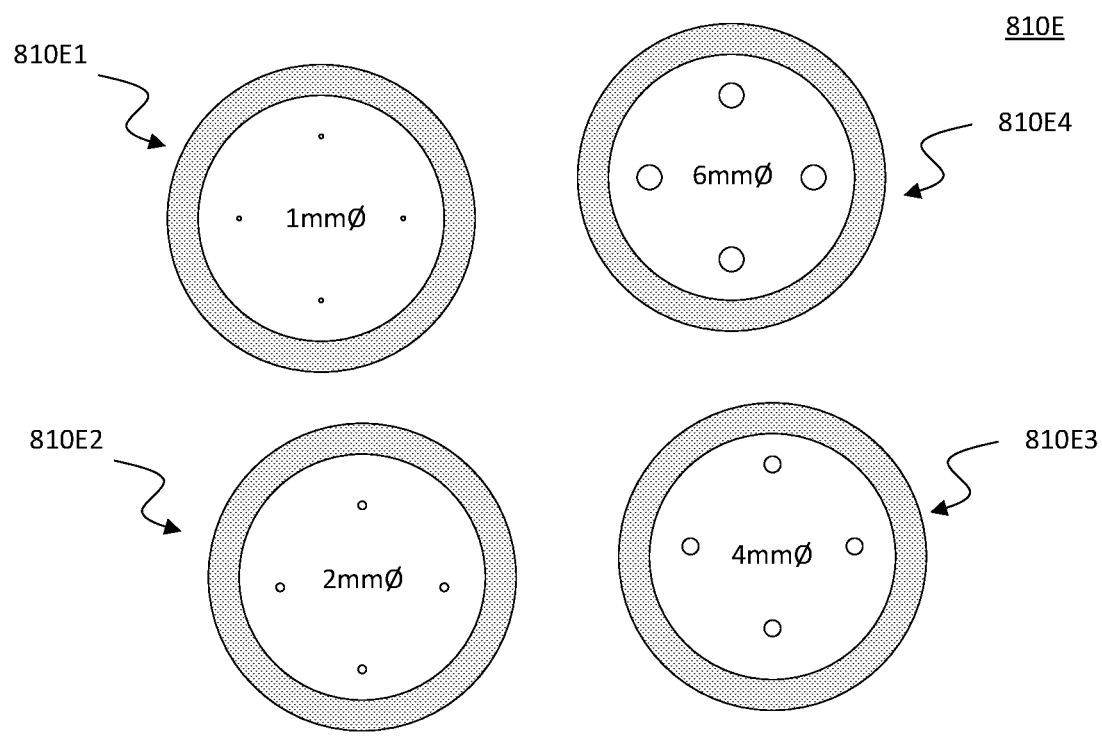
FIG. 8A shows a top view of the plurality of elongated elements.

FIG. 8A shows a top view of the plurality of elongated elements 810E. FIG. 8A shows the plurality of groups of elongated elements 810E. Plurality of groups of elongated elements 810E may include at least one of a first group of elongated elements 810E1 with a first width, e.g. 1 mm, a second group of elongated elements 810E2 with a second width, e.g. 2 mm, a third group of elongated elements 810E3 with a third width, e.g. 6 mm, a fourth group of elongated elements 810E4 with a fourth width, e.g. 6 mm. Plurality of elongated elements 810E may be rods. Base 810B may be circular, square or any suitable shapes. FIG. 8A also shows the plurality of ROI, i.e. rings, for scanned image. Processor 100P may retrieve and map the template for the fifth test panel 810 to identify the ROIs for the scanned image.

Figures 8B, 9:
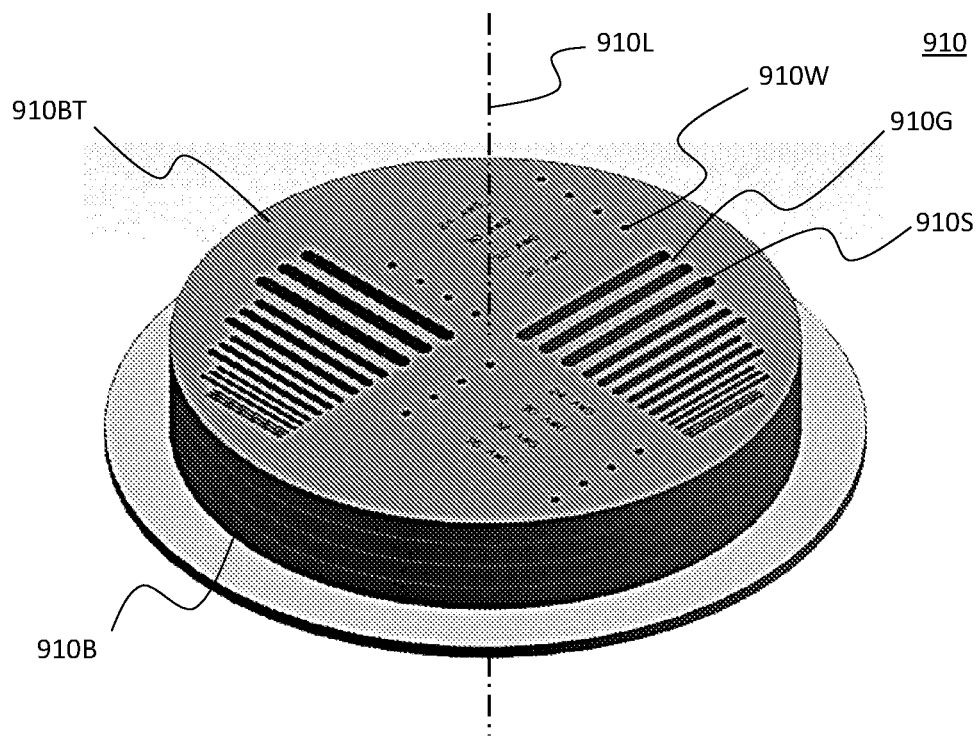
FIG. 8B shows an exemplary embodiment of the user evaluation interface for a test piece.
FIG. 9 shows a perspective view of an exemplary embodiment of a sixth test panel of the plurality of test panels.

FIG. 8B shows an exemplary embodiment of the user evaluation interface 812 for a test piece 300. user evaluation interface 812 may be the scoring table for the fifth test panel 810. Scoring table may include a plurality of ROIs, e.g. 1 mm wire, 2 mm wire, etc, and the score value, e.g. points, for each of the plurality of ROIs. Processor 100P may receive the scanned image of the fifth test panel 810 and evaluate the scanned image. For the objective evaluation, a template for the fifth test panel 810 may be retrieved by the processor 100P and mapped it onto the scanned image of the fifth test panel 810. A plurality of ROIs of the scanned image may be determined based on the template. For example, the plurality of ROIs may be rings surrounding each group of elongated elements 810E1. Processor 100P may extract the voxels and pixels in the plurality of ROIs and calculate the parameters of the plurality of ROIs. For example, the processor 100P may calculate the mean value and standard deviation of voxels or pixels within the rings as shown in FIG. 8A. Processor 100P may assign that the plurality of elongated elements 810E are "visible" if there are more than a pre-determined number of voxels or pixels, e.g. five, within the ring are greater than 3 standard deviations from the mean value. Processor 100P may assign the corresponding score values to the plurality of ROIs based on the scoring table. The same steps may be taken for the other groups of elongated elements 810E of different widths. For the subjective evaluation, the user may be prompted by the system 100 via the multimedia module 100U to set the plurality of rings to pass through the plurality of elongated elements 810E in air and in the base 810B. System 100 may prompt the user to cover the inner portion of the ring in the scanned image and to provide an input if traces of the group of elongated elements 810E are visible in the ring via the multimedia module 100U and/or I/O interface 100N. Processor 100P may be configured to assign a corresponding score value if no traces of the group of elongated elements 810E are visible. The same steps may be taken for the other groups of elongated elements 810E, both in the air and in the base 810B. Once the scoring table is completed, the system 100 may generate the first score value and the second score value for each performance characteristic of the scanner 10, i.e. metal artefact sensitivity, to evaluate the scan quality of the scanner 10.

FIG. 9 shows a perspective view of an exemplary embodiment of a sixth test panel 910 of the plurality of test panels 310. Sixth test panel 910 may be suitable for testing the grid and spatial resolution of the scanner 10. Sixth test panel 910 may include a base 910B having a top side 910BT and a bottom side (not shown in FIG. 9) opposite the top side 910BT and a central axis 910L through the top side 910BT and the bottom side. Base 910B may include an array of elongated slots 910S parallel to the top side 910BT and recesses towards the bottom side. Array of slots 910S may include a plurality of slots 910S with different widths and/or length. Each of the array of slots 910S may include a traverse wire (not shown in FIG. 9) parallel to and spaced from the top side 910BT of the base 910B to form an array of traverse wires. Each traverse wire may extend linearly in each of the array of slots 910S. Each of the array of slots 910S may include a traverse wire of a diameter that corresponds to the width and length of the slot 910S. Plurality of slots 910S may be arranged to be parallel to each other with a gap 910G between each other to form the array of slots 910S. Array of slots 910S may be arranged with the widest and longest slot at one end of the array and the narrowest and shortest slot at another end opposite the array. The width of each of the gaps 910G may decrease from the one end of the array to the other end. Array of slots 910S may be arranged into a plurality of groups of slots 910S. Each of the plurality of groups may include slots 910S of the same width and length and the gaps 910G therebetween may be of the same width as the slots 910S. As shown in FIG. A, each of the plurality of groups of slots 910S1 may include three slots 910S. The group of slots 910S1 at the one end of the array may have the widest and longest slots 910S with the widest gap 910Gs and the group 910S1 at the other end of the array may have the narrowest and shortest slots 910S with the narrowest gaps 910G. Sixth test panel 910 may include more than one array of slots 910S, e.g. two arrays. The width of the plurality of slots 910S as well as the diameter of the plurality of traverse wires may include at least one of 1 mm, 2 mm, 3 mm, 4 mm, 6 mm, etc. The width of the slot and diameter of the traverse wire may be determined as required for the test. For example, one group of slots 910S and wire may be 1 mm, another group may be 2 mm.

Sixth test panel 910 may include a row of longitudinal wires 910W. Row of longitudinal wires 910W may include a plurality of longitudinal wires 910W parallel to the central axis 910L, i.e. perpendicular to the top side 910BT, and extending from the top side 910BT to the bottom side and spaced apart from each other. Diameter of the wires 910W in the row of longitudinal wires 910W may increase from one end of the row to the other end of the row. For example, the wire gauge of the longitudinal wire may include at least one of 24AWG, 30AWG, 32AWG, 36AWG. Sixth test panel 910 may include more than one row of longitudinal wires 910W. Row of longitudinal wires 910W allows the test piece 300 to test the wire resolution of the scanner 10. Wire resolution determines the ability of the scanner 10 to resolve fine wires at high contrast. Sixth test panel 910 allows both the grid resolution and wire resolution of the scanner 10 to be tested simultaneously. Base 910B may be made from acrylic.

Figure 9A:
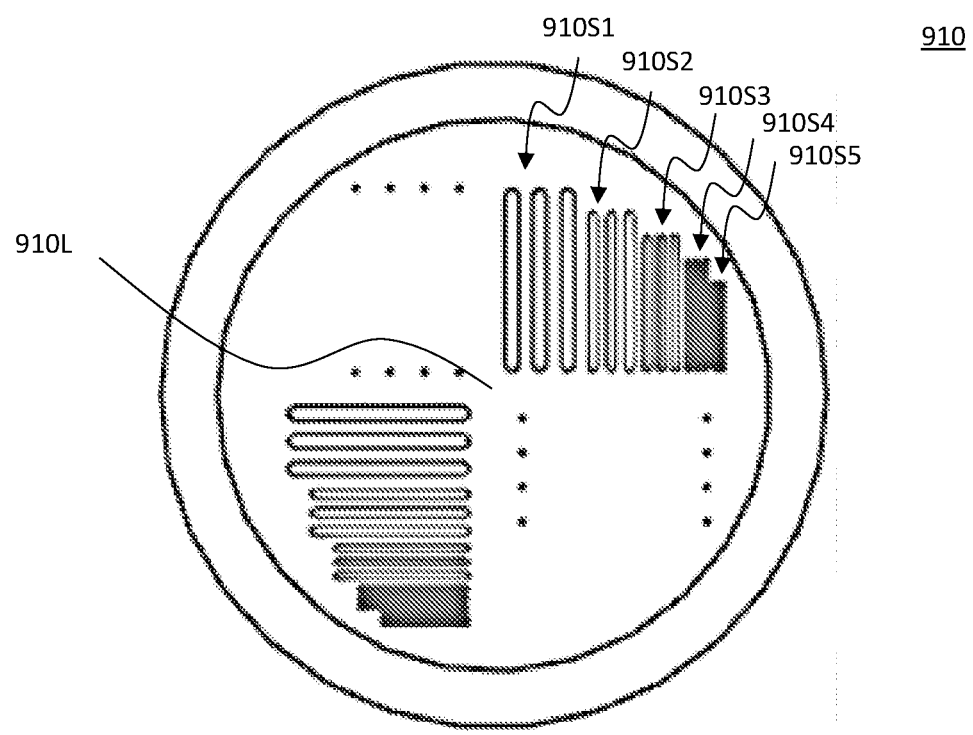
FIG. 9A shows a top view of the sixth test panel in FIG. 9.

FIG. 9A shows a top view of the sixth test panel 910 in FIG. 9. Array of slots 910S may be lined traversely to the central axis 910L. Each group of slots 910S may include three slots 910S and traverse wires of the same length and width and space equally apart from each other. The length and width of each group of slots 910S and the space therebetween decreases with the next group of slots 910S. Array of slots 910S may include at least one of a first group of slots 910S1 with a first width, e.g. 6 mm, a second group of slots 910S2 with a second width, e.g. 4 mm, a third group of slots 910S3 with a third width, e.g. 3 mm, a fourth group of slots 910S4 with a fourth width, e.g. 2 mm, and a fifth group of slots 910S5 with a fifth width, e.g. 1 mm. Each slot of the groups of slots 910S has a traverse wire with a diameter corresponding to its width. There may be one or more rows of longitudinal wires 910W. Each row of longitudinal wires 910W may include longitudinal wires 910W with wire gauge of 24AWG, 30AWG, 32AWG and 36AWG.

FIG. 9B shows an exemplary embodiment of the user evaluation interface 912 for a test piece 300. User evaluation interface 912 may be the scoring table for the sixth test panel 910. Scoring table may include a plurality of ROIs, e.g. 24 AWG, 1 mm Grid, etc, and the score value, e.g. points, for each of the plurality of ROIs. Processor 100P may receive the scanned image of the sixth test panel 910 and evaluate the scanned image. For the objective evaluation, a template for the sixth test panel 910 may be retrieved by the processor 100P and mapped it onto the scanned image of the sixth test panel 910. A plurality of ROIs of the scanned image may be determined based on the template. Processor 100P may be configured to carry out separate methods of evaluating the scanned image. System 100 may identify a plurality of ROIs base 910Bd on the template of the sixth test panel 910. For objective evaluation of the scanned image of the plurality of longitudinal wires 910W, the processor 100P may be configured to calculate a series of line profiles through each of the ROIs and sum up the series of line profiles along the length of the longitudinal wire 910W. Processor 100P may be configured to measure the height of the peak at about the centre of the longitudinal wire base 910Bd on the summed values, calculate the mean value of the voxels or pixels surrounding the longitudinal wire 910W and compare the peak height against the mean value. Processor 100P may assign the status of the longitudinal wire 910H to be "visible" if the peak height of the longitudinal wire 910H is more than a pre-determined number of times, e.g. 3 times, the standard deviation of the noise in the surrounding mean value. For objection evaluation of the plurality of group of wires, the processor 100P may be configured to sum values of voxels or pixels in the direction parallel to the group of wires and analyse the profile through the summed values across the profile of the group of wires. Processor 100P may be configured to calculate the maximum value and minimum value of the voxels or pixels in each group of wires. Processor 100P may assign the status that the group of wires is "visible" if the minimum value is less than a pre-determined percentage, e.g. 20%, of the maximum value. Processor 100P is configured to assign the score values for the plurality of ROIs based on the scoring table. For subjective evaluation, the user may be prompted by the system 100 via the multimedia module 100U to identify the plurality of longitudinal wires and groups of wires. If the user is able to identify them, the user may input the results in the scoring table via the multimedia module 100U and/or I/O interface 100N module. Processor 100P may be configured to assign the corresponding score values to the ROIs based on the scoring table. Once the scoring table is completed, the system 100 may generate the first score value and the second score value for each performance characteristic of the scanner 10, i.e. grid and spatial resolution, to evaluate the scan quality of the scanner 10.

FIG. 10 shows a perspective view of an exemplary embodiment of a seventh test panel 1010 of the plurality of test panels 310. Seventh test panel 1010 may be suitable for testing the sensitivity of the scanner 10 to small inclusions. Seventh test panel 1010 may include a base 1010B and a central axis 1010L through the base 1010B. Base 1010B may include at least one base panel 1010P. The at least one base panel 1010P may include a plurality of holes 1010H. Plurality of holes 1010H may have different diameters. Plurality of holes 1010H may have diameters in the range of 1.0 mm to 3.0 mm. For example, the diameters of the plurality of holes 1010H may be 1.0 mm, 1.5 mm, 2.0 mm, 2.5 mm and 3.0 mm. Plurality of holes 1010H may be through holes through the base panel 1010P. Base panel 1010P may include a pin (not shown in FIG. 10) in each of the plurality of holes 1010H. Pin may be made of tin or other materials. Plurality of holes 1010H may be arranged in a concentric circle around the central axis 1010L and spaced apart equally from each other. Plurality of holes 1010H may be arranged by the size of the holes 1010H in ascending or descending order in counter-clockwise direction. As shown in FIG. 10, the base 1010B may include an upper base panel 1010UP and a lower base panel 1010LP.

FIG. 10A and FIG. 10B show top views of the upper base panel 1010UP and the lower base panel 1010LP of the base 1010B in FIG. 10. FIG. 10A shows the upper base panel 1010UP and FIG. 10B shows the lower base panel 1010LP. Upper base panel 1010UP and the lower base panel 1010LP may be stacked onto each other such that the plurality of holes 1010H of each base panel 1010P are not aligned to each other. For example, referring to FIG. 10A, the plurality of holes 1010H may be oriented such that one of the plurality of holes 1010H may form an angle of about 72.0° from a reference line 1010F and referring to FIG. 10B, the plurality of holes 1010H may be oriented such that one of the plurality of holes 1010H may form an angle of about 36.0° from the reference line 1010F. Plurality of holes 1010H in the lower base panel 1010LP may include the pins.

FIG. 10C shows an exemplary embodiment of the user evaluation interface 1012 for a test piece 300. User evaluation interface 1012 may be the scoring table for the seventh test panel 1010. Scoring table may include a plurality of ROIs, e.g. 1.0 mm, 2.0 mm, etc., and the score value, e.g. points, for each of the plurality of ROIs. Processor 100P may receive the scanned image of the seventh test panel 1010 and evaluate the scanned image. Processor 100P may receive scanned image of the upper base panel 1010UP and the lower base panel 1010LP. For the objective evaluation, a template for the seventh test panel 1010 may be retrieved by the processor 100P and mapped it onto the scanned image of the seventh test panel 1010. A plurality of ROIs of the scanned image may be determined based on the template. For objective evaluation, the processor 100P may identify the plurality of holes 1010H and a background region, e.g. a 20 mm diameter circle, between the plurality of holes 1010H of each base panel 1010P as the plurality of ROIs. Processor 100P may be configured to calculate the mean value of the voxels or pixels within each ROI, i.e. the plurality of holes 1010H in each of the base panels 1010P and the background region. Processor 100P may assign the hole to be "visible" if the mean value of the plurality of holes 1010H is at least 2 standard deviations from the mean value of the background region of each base panel 1010P . . . . For subjective evaluation, the user may be prompted by the system 100 via the multimedia module 100U to identify the plurality of holes 1010H in the scanned image of the upper base panel 1010P without the pins and the scanned image of the lower base panel 1010P with the pins. If the user is able to identify them, the user may input the results in the scoring table via the multimedia module 100U and/or I/O interface 100N module. Processor 100P may assign the corresponding score values to the ROIs based on the scoring table. Once the scoring table is completed, the system 100 may generate the first score value and the second score value for each performance characteristic of the scanner 10, i.e. grid and spatial resolution, to evaluate the scan quality of the scanner 10.

FIG. 10D shows an exemplary embodiment of the overall score summary table 1014. When the scanned images of the plurality of test panels 310 have been evaluated, the system 100 may generate an overall first score value and overall second score value for the test piece 300 based on the individual first score values and individual second score values of the test panels 310 as shown in FIG. 10D.

Figure 11A:
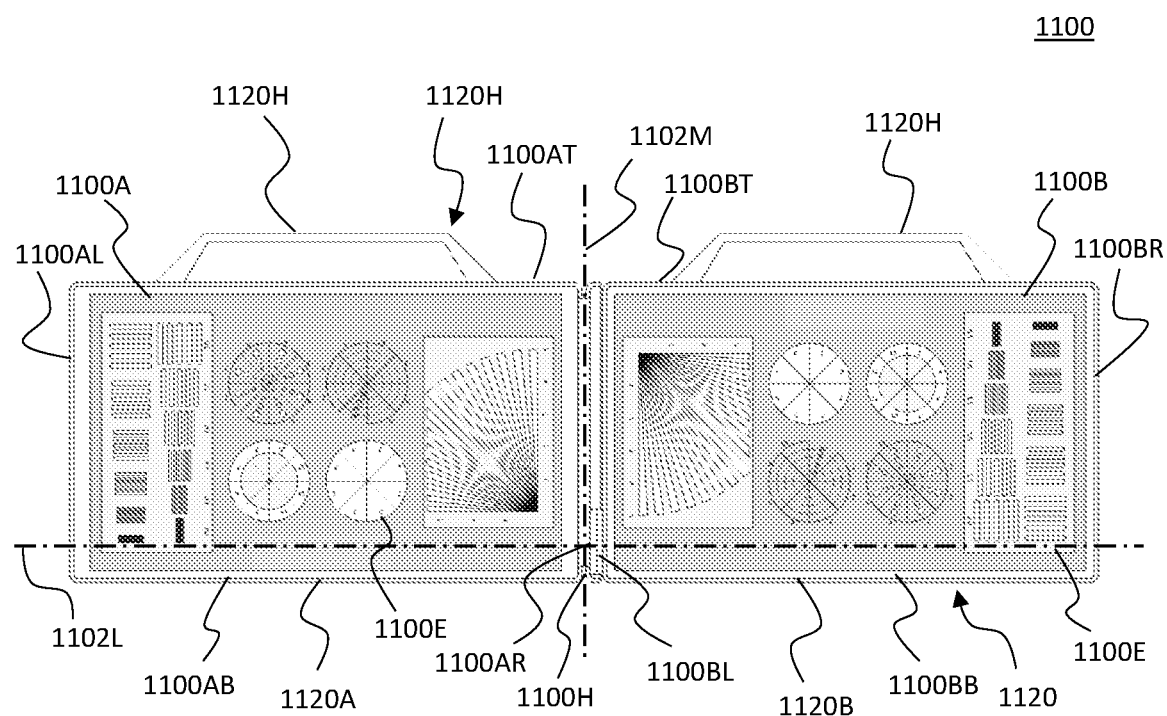
FIG. 11A shows a top view of an exemplary embodiment of the test piece.

FIG. 11A shows a top view of an exemplary embodiment of the test piece 1100. Test piece 1100 may be optimized for transmission X-ray image quality analysis. Scanner 10 may have a field of view in the range of 300 mm×300 mm to 4500 mm×6000 mm. Scanner 10 may have a linear X-ray system 100 with a scanning speed in the range of 0.01 m/S to 100 km/h. Scanned image may have an image resolution in the range of 0.3 mm to 10.0 mm spatial resolution. Test piece 1100 may be optimised for backscatter X-ray image quality analysis. Scanner 10 may have a field of view in the range of 300 mm×300 mm to 5000 mm×12000 mm spatial resolution. Scanner 10 may have a linear backscatter scanning system 100 with a scanning speed in the range of 0.01 m/s to 20 km/h. Scanned image may have an image resolution in the range of 0.5 mm to 20 mm.

Test piece 1100 may include a base panel 1100A having a longitudinal axis 1102L and a rotatable panel 1100B pivotally connected to the base panel 1100A along the longitudinal axis 1102L such that the rotatable panel 1100B may be rotatable about the longitudinal axis 1102L. Base panel 1100A may include a first plurality of test elements 1100E for testing the scan quality of the scanner 10. Rotatable panel 1100B may include a second plurality of test elements 1100E for testing the scan quality of the scanner 10. First plurality of test elements 1100E may be identical to the second plurality of test elements 1100E. When viewed from the top view, the second plurality of test elements 1100E of the rotatable panel 1100B may be inverted compared to the orientation of the first plurality of test elements 1100E of the base panel 1100A. Base panel 1100A may include one or more test elements 1100E. As shown in FIG. 11A, the base panel 1100A may include six test elements 1100E. Test piece 1100 may include a casing 1120 adapted to contain it therein. Casing 1120 may include a first part 1120A adapted to encase the base panel 1100A and a second part 1120B adapted to encase the rotatable panel 1100B. Casing 1120 may include a handle 1120H which includes a first half connected to the first part 1120A and a second half connected to the second part 1120B. Test piece 1100, having the first plurality of test elements 1100E, allows multiple tests to be conducted in a single scan.

Referring to FIG. 11A, the rotatable panel 1100B may be pivotally connected to the base panel 1100A along a lateral axis 1102M. Lateral axis 1102M may be perpendicular to the longitudinal axis 1102L. Lateral axis 1102M may be in the same plane as the longitudinal axis 1102L. As shown in FIG. 11A, the base panel 1100A may have a top side 1100AT, a bottom side 1100AB opposite the top side 1100AT, a left side 1100AL and a right side 1100AR extending from the top side 1100AT to the bottom side 1100AB and the rotatable panel 1100B may have a top side 1100BT, a bottom side 1100BB opposite the top side 1100BT, a left side 1100BL and a right side 1100BR extending from the top side 1100BT to the bottom side 1100BB. Test piece 1100 may include a hinge 1120H attached to the right side 1100AR of the base panel 1100A and the left side 1100BL of the rotatable panel 1100B to enable the rotatable panel 1100B to rotate at about the lateral axis 1102M. Hinge 1120H may be adapted to allow the rotatable panel 1100B to rotate at about the longitudinal axis 1102L.

Figure 11B:
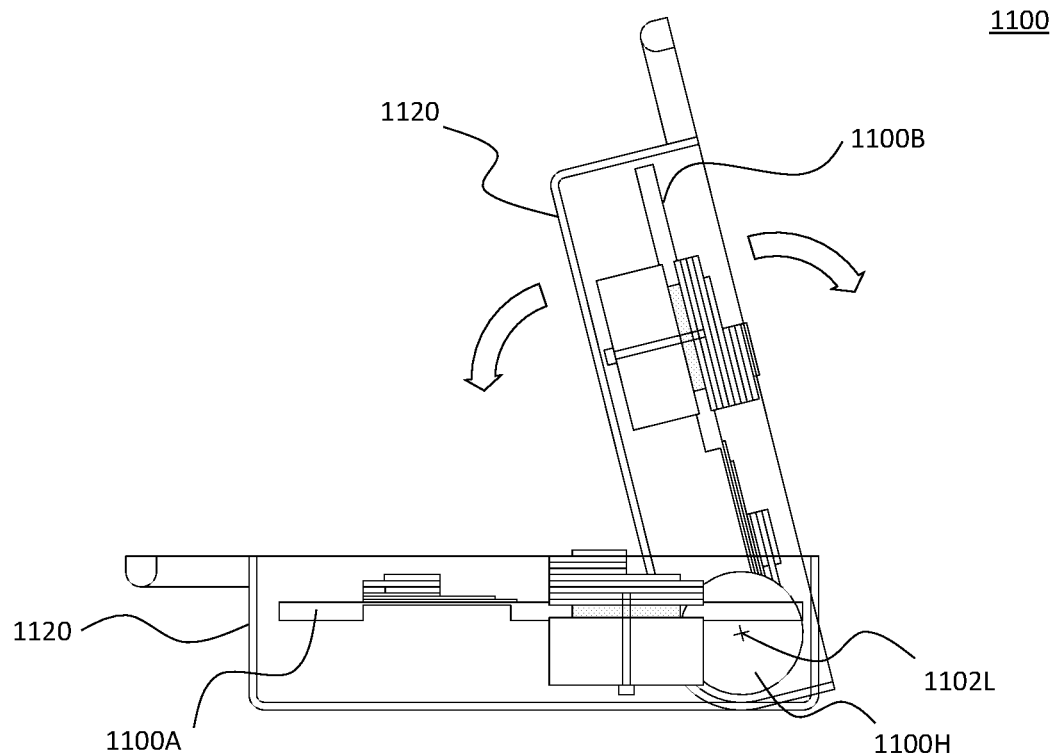
FIG. 11B shows an elevation view of the test piece in the rotated position.

FIG. 11B shows an elevation view of the test piece 1100 in the rotated position. Portions of the casing 1120 have been removed to show the sectional view of the base panel 1100A and the rotatable panel 1100B. Rotatable panel 1100B may be rotated about the longitudinal axis 1102L to a rotated position. Rotatable panel 1100B may be rotated at about the hinge 1100H. Rotatable panel 1100B may be rotated to form an angle between the rotatable panel 1100B and the base panel 1100A. Rotatable panel 1100B may be rotated such that the angle may be from 1° to 90°.

Figure 11C:
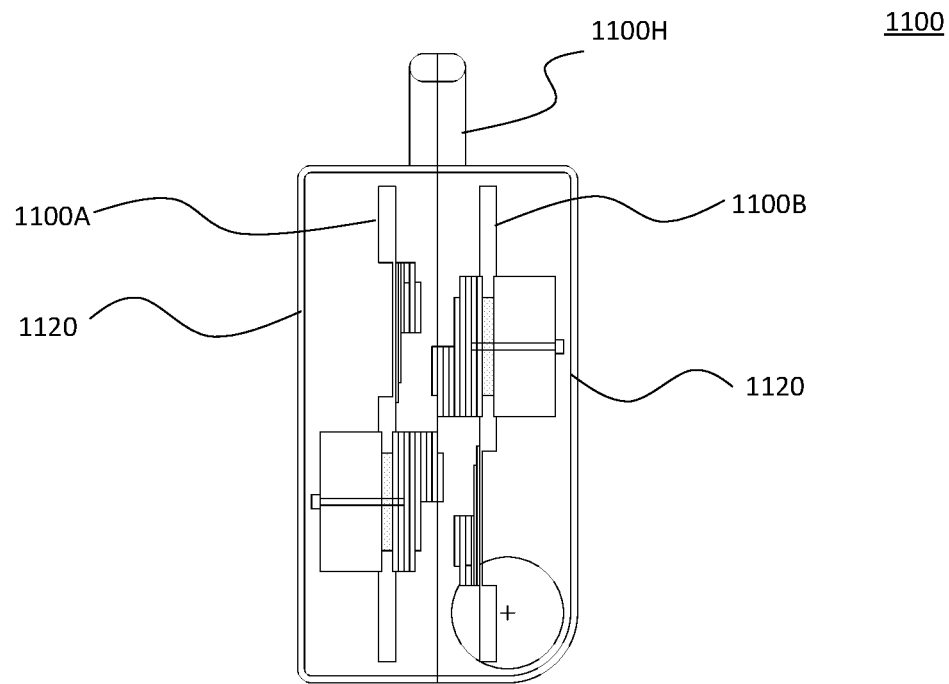
FIG. 11C shows an elevation view of the test piece when in the closed position.

FIG. 11C shows an elevation view of the test piece 1100 when in the closed position. Portions of the casing 1120 have been removed to show the sectional view of the base panel 1100A and the rotatable panel 1100B. Rotatable panel 1100B may be rotatable about the lateral axis 1102M (not shown in FIG. 11C) to rotate between a closed position where the rotatable panel 1100B is rotated to face the base panel 1100A as shown in FIG. 11C and an opened position where the rotatable panel 1100B may be in the same plane as the base panel 1100A as shown in FIG. 11A. Test piece 1100 in FIG. 11 may be known to be in a carry mode where a user may carry the test piece 1100 by the handle 1120H.

Figure 11D:
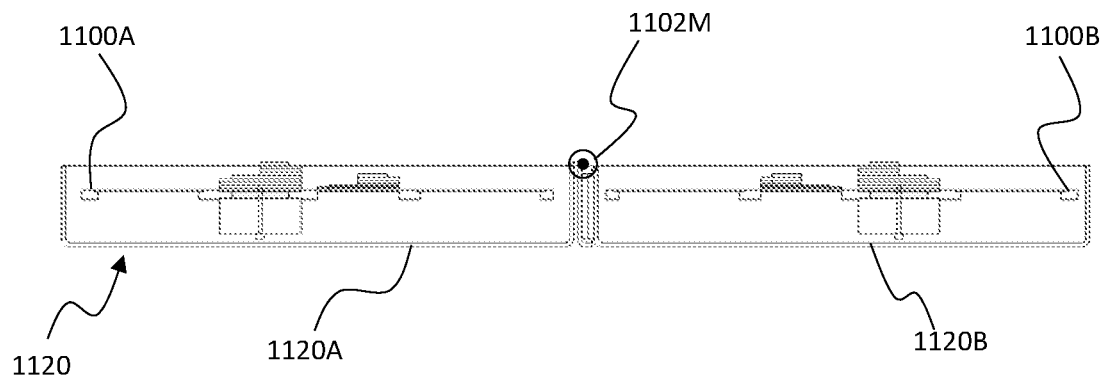
FIG. 11D shows an elevation view of the test piece in FIG. 11A in the opened position.

FIG. 11D shows an elevation view of the test piece 1100 in FIG. 11A in the opened position. Portions of the casing 1120 have been removed to show the sectional view of the base panel 1100A and the rotatable panel 1100B. Base panel 1100A may be mounted onto the first part 1120A of the casing 1120 and the rotatable panel 1100B may be mounted onto the second part 1120B of the casing 1120.

Figure 11E:
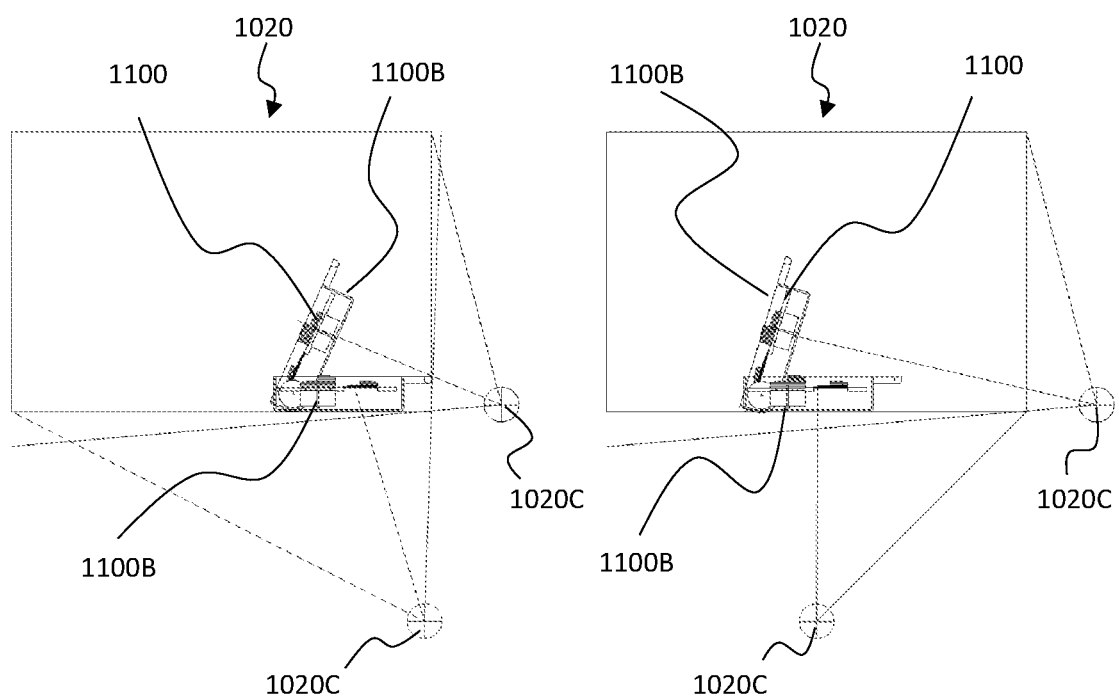
FIG. 11E shows an elevation view of the test piece being used in a dual-view scanner.

FIG. 11E shows an elevation view of the test piece 1100 being used in a dual-view scanner 10 1020. Test piece 1100 allows a single scan by single-view or dual-view scanners, e.g. X-ray scanners, to produce 2D scanned images. Due to the flexibility to rotate about the longitudinal axis 1102L, the test piece 1100 is able to be adjusted to suit the location of the views of dual-view scanners at any position. As shown in both figures in FIG. 11E, while the locations of the views 1020C in the dual-view scanners 1020 may be different, the test piece 1100 may be orientated by rotating the rotatable panel 1100B and placing the base panel 1100A according to the locations of the views 1020C in the dual-view scanner 1020 to enable the test piece 1100 to be normal to the beam of the scanner 10. Compared to conventional test piece which is required to be placed according for each view and scanned twice in a dual-view scanner 1020, the present test piece 1100 allows a single-pass scan to test both the views in the dual-view scanner 1020. Further, the test piece 1100 is compact and lightweight. Thus, the test piece 1100 is portable and easy to use. As mentioned above, the test piece 1100 may be carried around in the casing 1120 with the handle 1120H. When in use, the casing 1120 may be opened such that the second part 1120B of the casing 1120 together with the rotatable panel 1100B may be rotated at about the lateral axis 1102M from the closed position to the opened position. When in the first part 1120A of the casing 1120 together with the base panel 1100A is laid on the scanner 10, the second part 1120B of the casing 1120 together with the rotatable panel 1100B may be angled according to the view of the scanner 10. Hence, the scanner 10 may be tested by passing the test piece 1100 once therethrough to obtain the scanned image, i.e. the test piece 1100 allows a single pass through the dual-view scanner 1020. Each view of the scanner 10 may include an X-ray generator and a plurality of X-ray detecting elements.

Figure 12:
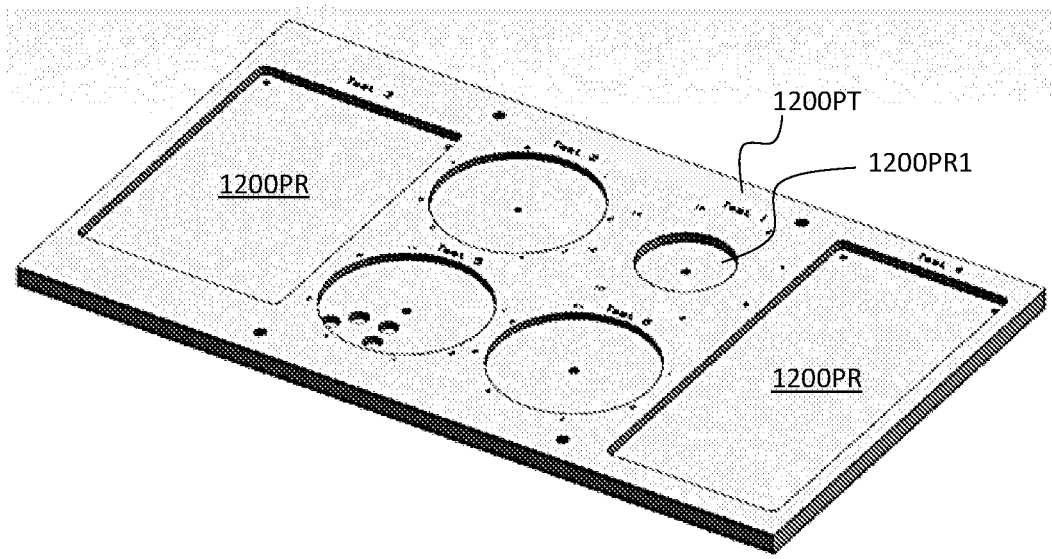
FIG. 12 shows a perspective view of an exemplary embodiment of a base plate of the base panel and/or the rotatable panel.

FIG. 12 shows a perspective view of an exemplary embodiment of a base plate 1200P of the base panel 1100A and/or the rotatable panel 1100B. Base panel 1100A may include the base plate 1200P adapted to mount the test elements 1100E thereon. Base plate 1200P may include a top side 1200PT and a bottom side 1100AB (not shown in FIG. 12) opposite the top side 1100AT. Base plate 1200P may include a plurality of recesses 1200PR adapted to receive the plurality of test elements 1100E therein.

Figure 13A:
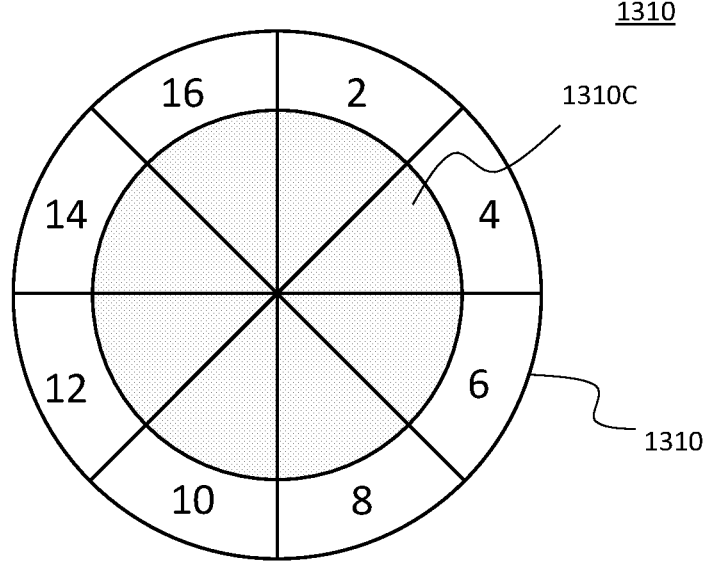
FIG. 13A shows a schematic diagram of a top view of an exemplary embodiment of the first test element of the plurality of test elements.

FIG. 13A shows a schematic diagram of a top view of an exemplary embodiment of the first test element 1310 of the plurality of test elements 1100E. First test element 1310 may be suitable for testing the penetration level of the scanner 10. First test element 1310 may include a plurality of blocks 1310B of different heights. For example, the plurality of blocks 1310B may include eight blocks 1310B, each of a different height, e.g. 2 mm, 4 mm, 6 mm, 8 mm, 10 mm, 12 mm, 14 mm, 16 mm. Plurality of blocks 1310B may be arranged by their height in descending order. Plurality of blocks 1310B may form a step with the highest block at one end and the lowest block at another end opposite the one end. Each of the plurality of blocks 1310B may be a wedge such that the plurality of blocks 1310B may be arranged to form a circular block as shown in FIG. 13A. Plurality of blocks 1310B may be made of steel. Plurality of blocks 1310B may be mounted onto the top side 1200PT of the base plate 1200P (not shown in FIG. 13A). First test element 1310 may include a centre block 1310C beneath the plurality of blocks 1310B. Centre block 1310C may be of a different material from the plurality of blocks 1310B. Centre block 1310C may be made of lead. Centre block 1310C may be embedded in the base plate 1200P. Referring to FIG. 12, the base plate 1200P may include a first recess 1200PR1 adapted to receive the centre block 1310C. Centre block 1310C may be circular.

Figures 13B, 13C:
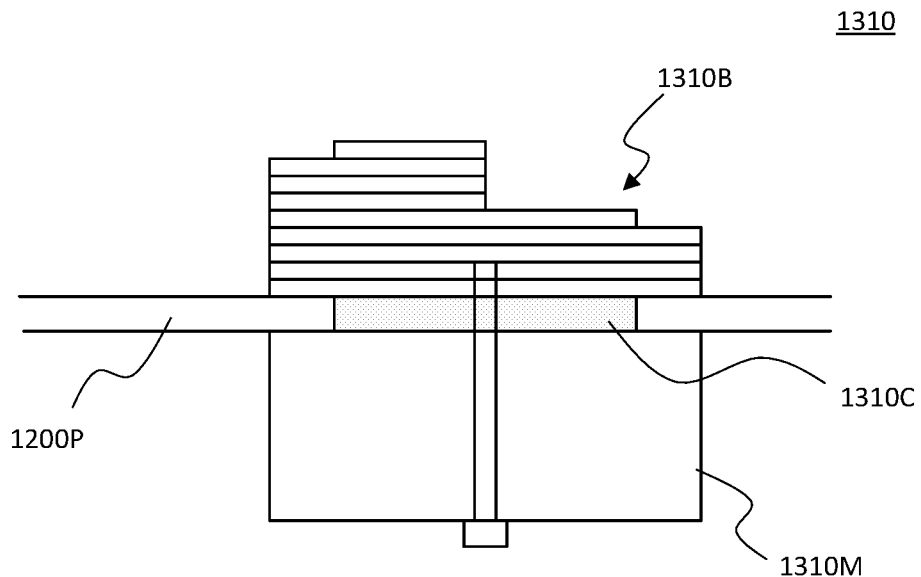
FIG. 13B shows a schematic diagram of a sectional view of the first test piece in FIG. 13A.
FIG. 13C shows an exemplary embodiment of the user evaluation interface for a test piece.

FIG. 13B shows a schematic diagram of a sectional view of the first test piece 1100 in FIG. 13A. First test element 1310 may include a bottom block 1310M beneath the plurality of blocks 1310B. Bottom block 1310M may be disposed beneath the centre block 1310C such that the centre block 1310C may be disposed between the plurality of blocks 1310B and the bottom block 1310M. Bottom block 1310M may be mounted to the bottom side of the base plate 1200P. Bottom block 1310M may be 22 mm thick. As shown in FIG. 13B, the plurality of blocks 1310B may have different height. Bottom block 1310M may be circular.

FIG. 13C shows an exemplary embodiment of the user evaluation interface 1312 for a test piece 1100. User evaluation interface 1312 may be the scoring table for the first test element 1310. Scoring table may include a plurality of ROIs, e.g. Step 1, Step 2, etc, and the score value, e.g. points, for each of the plurality of ROIs. Processor 100P may receive the scanned image of the first test element 1310 and evaluate the scanned image. For the objective evaluation, a template for the first test element 1310 may be retrieved by the processor 100P and mapped onto the scanned image of the first test element 1310. A plurality of ROIs of the scanned image may be determined based on the template. For example, one or more ROIs may be determined in each of the plurality of blocks 1310B with and without the centre block 1310C. Processor 100P may be configured to calculate the mean value and standard deviation of the plurality of ROIs. Processor 100P may assign the status of the step being "visible" if the difference between the mean value in an ROI of the block with the centre block 1310C and an ROI of the block without the centre block 1310C is greater than one standard deviation. Processor 100P may be configured to assign the corresponding score value to the ROI based on the scoring table. For subjective evaluation, the user may be prompted by the system 100 via the multimedia module 100U to distinguish a clear step between the part of the block with the centre block 1310C and the part of the block without the centre block 1310C. Processor 100P may receive an input via the multimedia module 100U or I/O module whether the step is visible and assign a corresponding score value based on the scoring table 1312. Processor 100P may assign the corresponding score value to the ROI based on the scoring table. The same steps may be taken for the other plurality of blocks 1310B. Once the scoring table is completed, the system 100 may generate the first score value and the second score value for each performance characteristic of the scanner 10, i.e. penetration level, to evaluate the scan quality of the scanner 10.

Figures 14A, 14B:
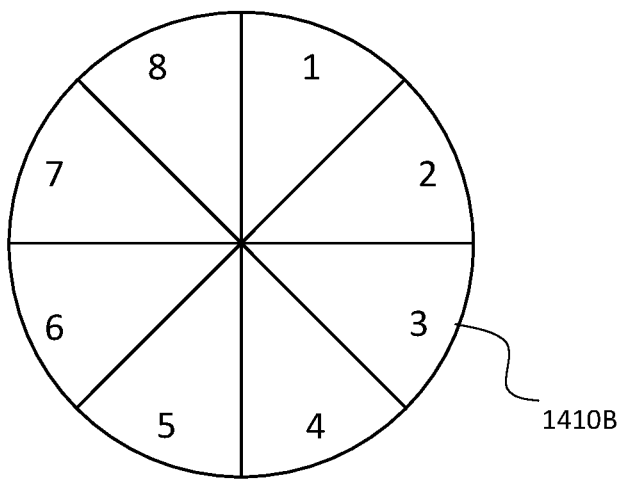
FIG. 14A shows a schematic diagram of a top view of an exemplary embodiment of the second test element of the plurality of test elements.
FIG. 14B shows an exemplary embodiment of the user evaluation interface for a test piece.

FIG. 14A shows a schematic diagram of a top view of an exemplary embodiment of the second test element 1410 of the plurality of test elements 1100E. Second test element 1410 may be suitable for testing the ability of the scanner 10 to discriminate between materials of different composition. Second test element 1410 may be suitable for testing the ability to test the effective nuclear charge ($Z_{effective}$). Second test element 1410 may include a plurality of blocks 1410B made of different materials so that the plurality of blocks 1410B are of different densities. Each of the plurality of blocks 1410B may be a wedge such that the plurality of blocks 1410B may be arranged to form a circular block as shown in FIG. 14A. Plurality of blocks 1410B may be mounted onto the top side 1200PT of the base plate (not shown in FIG. 14A). Plurality of blocks 1410B may be of the same height. The materials of the plurality of blocks 1410B may be selected from a range of densities in the organic range so that the scan quality and sensitivity of the scanner 10 in that range may be tested. For example, the materials may include polypropylene, polyamide 12 or polypropylene 10% glass, polypropylene 30% glass, peek, acetal homopolymer (e.g. Delrin™), chlorinated PVC, polyvinylidene fluoride, polytetrafluoroethylene (e.g. Teflon™). Base may be made of acrylic (e.g. Perspex™).

FIG. 14B shows an exemplary embodiment of the user evaluation interface 1412 for a test piece 1100. User evaluation interface 1412 may be the scoring table for the second test element 1410. Scoring table may include a plurality of ROIs, e.g. Test Region 1, Test Region 2, etc, and the score value, e.g. points, for each of the plurality of ROIs. Processor 100P may receive the scanned image of the second test element 1410 and evaluate the scanned image. For the objective evaluation, a template for the second test element 1410 may be retrieved by the processor 100P and mapped onto the scanned image of the second test element 1410. A plurality of ROIs of the scanned image may be determined based on the template. For example, one or more ROIs may be determined in each of the plurality of blocks 1410B. Processor 100P may be configured to receive the $Z_{effective}$ value for each of the plurality of ROIs from the scanner 10. Processor 100P may be configured to calculate the mean value and standard deviation of the $Z_{effective}$ value for each of the plurality of ROIs. Processor 100P may be configured to assign a "Yes" status if the mean value of an ROI of one block, e.g. Test Region 1, is more than one standard deviation than the mean value of the next block, e.g. Test Region 2 and assign the corresponding score value based on the scoring table 1312. Processor 100P may be configured to assign the corresponding score value of the ROI based on the scoring table. The same steps may be taken for the other plurality of blocks 1410B. For subjective evaluation, the system 100 may prompt the user to set the scanner 10 to colour based on the material type ($Z_{effective}$ value) of the plurality of blocks 1410B. System 100 may prompt the user to determine if one block is distinguishable from an adjacent block. System 100 may be configured to receive an input whether the one block is distinguishable from an adjacent block and assign a corresponding score value for the two blocks 1410B based on the scoring table 1412. Processor 100P may be configured to assign the corresponding score value of the ROI based on the scoring table. Once the scoring table is completed, the system 100 may generate the first score value and the second score value for each performance characteristic of the scanner 10, i.e. penetration level, to evaluate the scan quality of the scanner 10.

Figures 15, 15A:
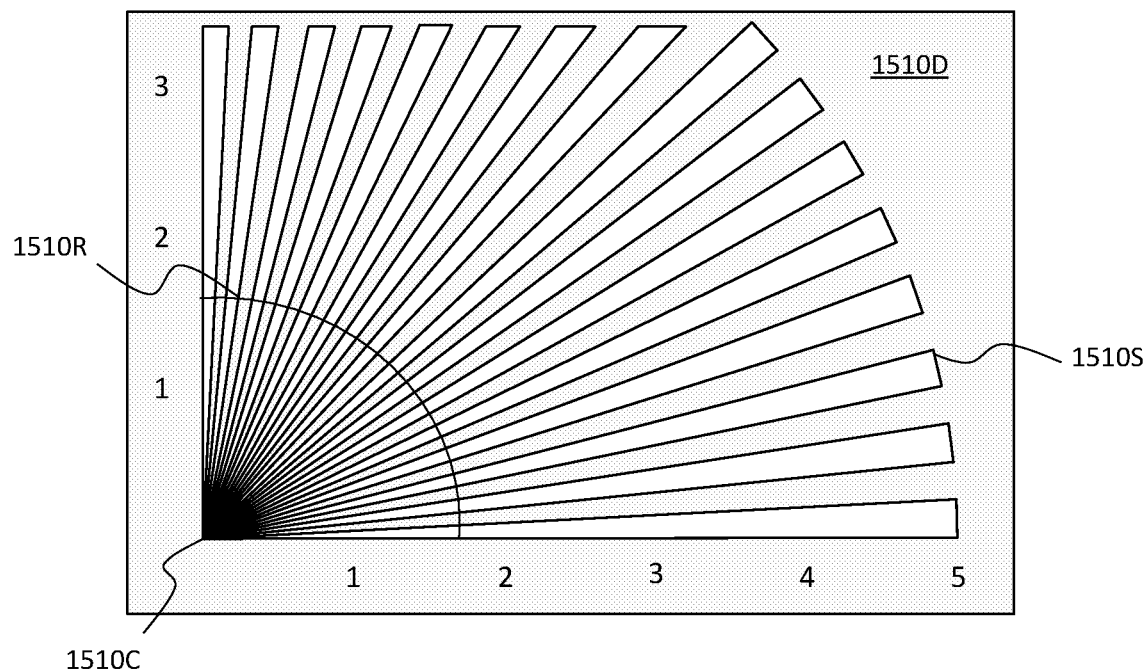
FIG. 15 shows a top view of an exemplary embodiment of a third test element of the plurality of test elements.
FIG. 15A shows an exemplary embodiment of the user evaluation interface for a test piece.

FIG. 15 shows a top view of an exemplary embodiment of a third test element 1510 of the plurality of test elements 1100E. Third test element 1510 may be suitable for testing the spatial resolution of the scanner 10. Third test element 1510 may include a board 1510D and a plurality of strips 1510S thereon. Each of the plurality of strips 1510S may be wedge-shaped such that each has a broad end and a sharp tip opposite the broad end. The sharp tips of the plurality of strips 1510S may converge at a centre point 1510C and the broad end of the plurality of strip may be spaced apart from each other. Plurality of strips 1510S may form a truncated fan. Third test element 1510 may be mounted on the top side 1200PT of the base plate (not shown in FIG. 15). Plurality of strips 1510S may be made of steel.

FIG. 15A shows an exemplary embodiment of the user evaluation interface 1512 for a test piece 1100. user evaluation interface 1512 may be the scoring table for the third test element 1510. Scoring table may include a plurality of ROIs, e.g. 0.5 mm Test Region, 1.0 mm Test Region, etc, and the score value, e.g. points, for each of the plurality of ROIs. Processor 100P may receive the scanned image of the third test element 1510 and evaluate the scanned image. For the objective evaluation, a template for the third test element 1510 may be retrieved by the processor 100P and mapped onto the scanned image of the third test element 1510. A plurality of ROIs of the scanned image may be determined based on the template. For example, the ROI may be a plurality of circular lines 1510R at various radius from the centre point 1510C. Processor 100P may be configured to project the circular line 1510R (see FIG. 15) at constant radius from the centre point 1510C across the plurality of strips 1510S, i.e. beyond one side of the truncated fan to beyond the other side. Processor 100P may be configured to calculate the intensity profile along each circular line 1510R at pre-determined intervals of the radius, e.g. 1 mm, 2 mm, etc., from the centre point 1510C. For each of the intensity profiles, the processor 100P may be configured to calculate the modulation between the peaks and valleys. For example, the processor 100P may be configured to calculate the mean value and standard deviation of the peaks and valleys. Processor 100P may be configured to assign a "visible" status if the difference in the mean value of the peaks and valleys is at least one standard deviation, round up to the nearest 0.5 mm radius and assign the corresponding score value based on the scoring table 1512. Processor 100P may be configured to assign the corresponding score value of the ROI based on the scoring table. The same steps may be taken for the other pre-determined radius as shown in the scoring table 1512. For subjective evaluation, the system 100 may prompt the user to identify the point at which the plurality of strips 1510S fused with each other to the point that they are no longer distinguishable. Based on the radius assigned at the sides of the plurality of strips 1510S, the system 100 may receive the input from the user, via the multimedia module 100U or I/O interface 100N module, the radiuses at which the plurality of strips 1510S are visible. For example, if the plurality of strips 1510S are visible at a radius of 2.0 mm, the user may enter the radiuses at 2.5 mm and 3.0 mm. Processor 100P may assign a corresponding score value based on the scoring table. Once the scoring table is completed, the system 100 may generate the first score value and the second score value for each performance characteristic of the scanner 10, i.e. spatial resolution, to evaluate the scan quality of the scanner 10.

Figures 16, 16A:
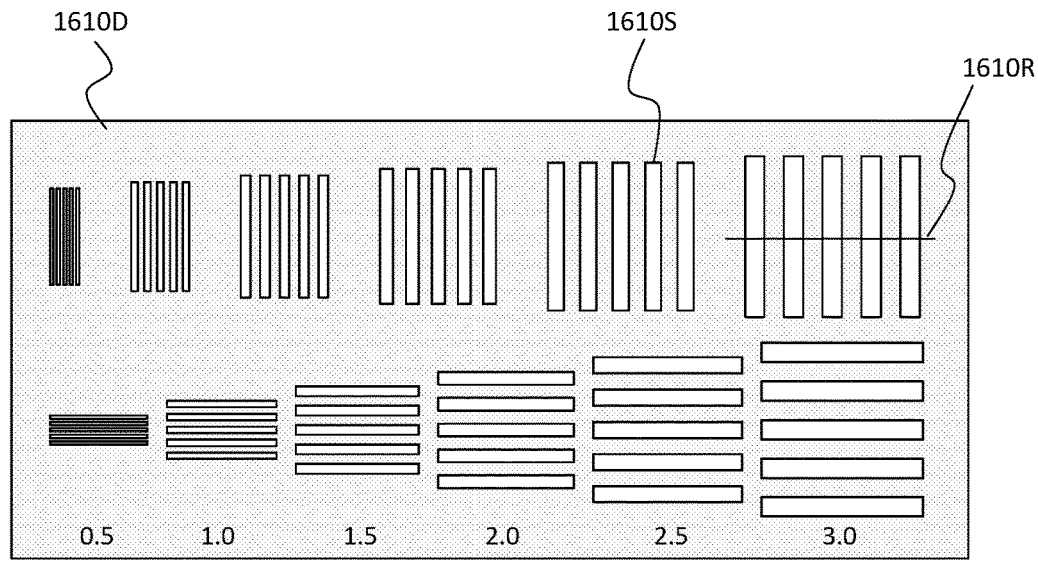
FIG. 16 shows a top view of an exemplary embodiment of a fourth test element of the plurality of test elements.
FIG. 16A shows an exemplary embodiment of the user evaluation interface for a test piece.

FIG. 16 shows a top view of an exemplary embodiment of a fourth test element 1610 of the plurality of test elements 1100E. Fourth test element 1610 may be suitable for testing the grid resolution of the scanner 10. Fourth test element 1610 may include a board 1610D and a plurality of bars 1610S of different widths thereon. Plurality of bars 1610S may be grouped into a plurality of groups of bars 1610S of different widths. Plurality of bars 1610S in each of the groups of bars 1610S may be of the same length. Plurality of bars 1610S in each of the groups of bars 1610S may be of spaced from each other by gaps of the same width as the plurality of bars 1610S. Plurality of bars 1610S may be made of steel. Plurality of bars 1610S may have a width in the range of 0.5 mm to 3.0 mm. Plurality of groups of bars 1610S may be grouped in widths of 0.5 mm, 1.0 mm, 1.5 mm, 2.0 mm, 2.5 mm, 3.0 mm. Plurality of groups of bars 1610S may be arranged according to the widths in ascending order. Plurality of bars 1610S may be arranged into two sections such that the plurality of bars 1610S in one section is perpendicular to the plurality of bars 1610S in the other section.

FIG. 16A shows an exemplary embodiment of the user evaluation interface 1612 for a test piece 1100. User evaluation interface 1612 may be the scoring table for the fourth test element 1610. Scoring table may include a plurality of ROIs, e.g. 0.5 mm Test Region, 1.0 mm Test Region, etc, and the score value, e.g. points, for each of the plurality of ROIs. Processor 100P may receive the scanned image of the fourth test element 1610 and evaluate the scanned image. For the objective evaluation, a template for the fourth test element 1610 may be retrieved by the processor 100P and mapped onto the scanned image of the fourth test element 1610. A plurality of ROIs of the scanned image may be determined based on the template. For example, the ROI may be a plurality of linear lines 1610R across each group of bars 1610S. Processor 100P may be configured to project the linear line 1610R (see FIG. 16) across each group of bars 1610S. Processor 100P may be configured to extract the profile along each linear line 1610R. For each of the plurality of profiles, the processor 100P may be configured to calculate the mean value and standard deviation of the peaks and valleys in the profiles. Processor 100P may be configured to assign a "visible" status if the difference in the mean value of the peaks and valleys is at least one standard deviation and assign the corresponding score value based on the scoring table. The same steps may be taken for the groups of bars 1610S. Processor 100P may assign the corresponding score value only if both groups of bars 1610S in both sections are "visible". For subjective evaluation, the system 100 may prompt the user to identify all the bars 1610S in each group of bars 1610S before inputting a "visible" status into the system 100 via the multimedia module 100U or I/O interface 100N module. Processor 100P may receive the input and assign a corresponding score value based on the scoring table 1512. Processor 100P may assign the corresponding score value only if both groups of bars 1610S in both sections are "visible". Once the scoring table is completed, the system 100 may generate the first score value and the second score value for each performance characteristic of the scanner 10, i.e. grid resolution, to evaluate the scan quality of the scanner 10.

Figure 17:
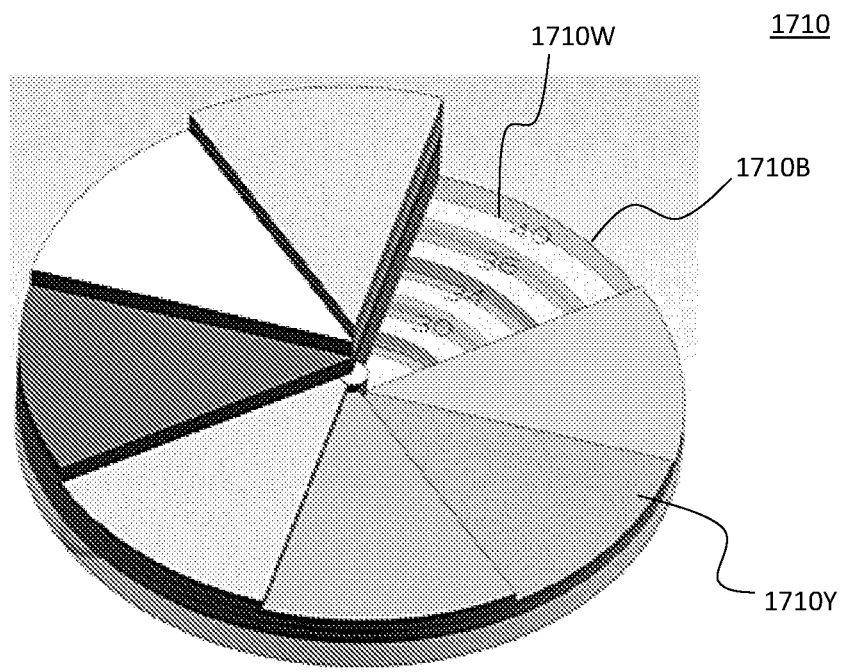
FIG. 17 shows a perspective view of an exemplary embodiment of a fifth test element of the plurality of test elements.

FIG. 17 shows a perspective view of an exemplary embodiment of a fifth test element 1710 of the plurality of test elements 1100E. Fifth test element 1710 may be suitable for testing the wire resolution of the scanner 10. Fifth test element 1710 may include a base layer 1710B having a plurality of wires 1710W of different diameters and a plurality of layers 1710Y on the base layer 1710B. Each of the plurality of layers 1710Y on top of a bottom layer 1710Y may have a smaller area than the bottom layer 1710Y such that the bottom layer 1710Y may be exposed. The lowest layer 1710Y of the plurality of layers 1710Y may have a smaller area than the base layer 1710B such that the base layer 1710B is exposed. Base layer 1710B may be circular and each of the plurality of layers 1710Y may be a sector of a circle. For example, the lowest layer 1710Y may be a sector with an internal angle of 320°, the next layer 1710Y on top thereof may be a sector with an internal angle of 280°, the next layer 1710Y on top thereof may be a sector with an internal angle of 240°, the next layer 1710Y on top thereof may be a sector with an internal angle of 200°, the next layer 1710Y on top thereof may be a sector with an internal angle of 160°, the next layer 1710Y on top thereof may be a sector with an internal angle of 120°, the next layer 1710Y on top thereof may be a sector with an internal angle of 80°, and the next layer 1710Y on top thereof may be a sector with an internal angle of 40°. Plurality of layers 1710Y may be aligned along one side of thereof forming a flat surface. As shown in FIG. 17, the plurality of layers 1710Y may form a plurality of sectors of different heights. Plurality of wires 1710W may be arranged in concentric circles space apart from each other. Plurality of wires 1710W may be arranged in the order of the thickness of diameter of the wires 1710W such that the thickest wire 1710W may be the most outer circle and the thinnest wire 1710W may be the most inner circle. Plurality of wires 1710W may have wire gauges of 30AWG, 34AWG, 36AWG and 40AWG. Fifth test element 1710 may be mounted on the top side 1100AT of the base plate 1200P. Base layer may be made of acrylic.

Figure 17A:
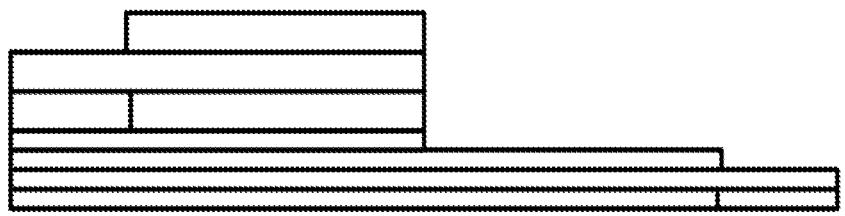
FIG. 17A shows an elevation view of the plurality of layers in FIG. 17.

FIG. 17A shows an elevation view of the plurality of layers 1710Y in FIG. 17. As shown in FIG. 17A, the fifth test element 1710 may include the plurality of layers 1710Y.

FIG. 17B shows an exemplary embodiment of the user evaluation interface 1712 for a test piece 1100. User evaluation interface 1712 may be the scoring table for the fifth test element 1710. Scoring table may include a plurality of ROIs, e.g. Test Region 1, Test Region 2, etc.

FIG. 17C shows of a matrix 1712M for calculating the first score value and second score value of the fifth test element 1710. System 100 may include a matrix 1712M for test elements 1100E with more than one dimension. For example, the fifth test element 1710 may have a first dimension of the thickness of the plurality of layers 1710Y and a second dimension of the wire gauge of the plurality of wires 1710W. Matrix 1712M may include both dimensions and the corresponding score values for the dimensions. As shown in the matrix 1712M, the score value for the thickest layer and highest wire gauge, e.g. 40 AWG and 7 mm, may have the highest weight or score value.

For the objective evaluation, a template for the fifth test element 1710 may be retrieved by the processor 100P and mapped onto the scanned image of the fifth test element 1710. A plurality of ROIs of the scanned image may be determined based on the template. For example, the ROI may be a plurality of linear lines across the plurality of wires 1710W in each of the plurality of sectors. Processor 100P may be configured to project the linear line across each of the plurality of sectors. Processor 100P may be configured to extract the profile along each linear line. For each of the plurality of profiles, the processor 100P may be configured to calculate the mean value of the wire and mean value of the background of the wire, which is provided by the plurality of layers 1710Y. Processor 100P may be configured to assign a "visible" status if the difference in the mean value of the wire and background is at least one standard deviation and assign the corresponding score value based on the matrix 1712M. Processor 100P may be configured to assign the corresponding score value of the ROI based on the scoring table. The same steps may be taken for each of the plurality of wires 1710W in each of the plurality of sectors. For subjective evaluation, the system 100 may prompt the user to identify the number of wires 1710W visible in each of the plurality of sectors and input into the system 100 via the multimedia module 100U and/or I/O interface 100N. Processor 100P may be configured to receive the input assign a corresponding score value based on the matrix 1712M. Once the scoring table is completed, the system 100 may generate the first score value and the second score value for each performance characteristic of the scanner 10, i.e. wire resolution, to evaluate the scan quality of the scanner 10.

Figure 18:
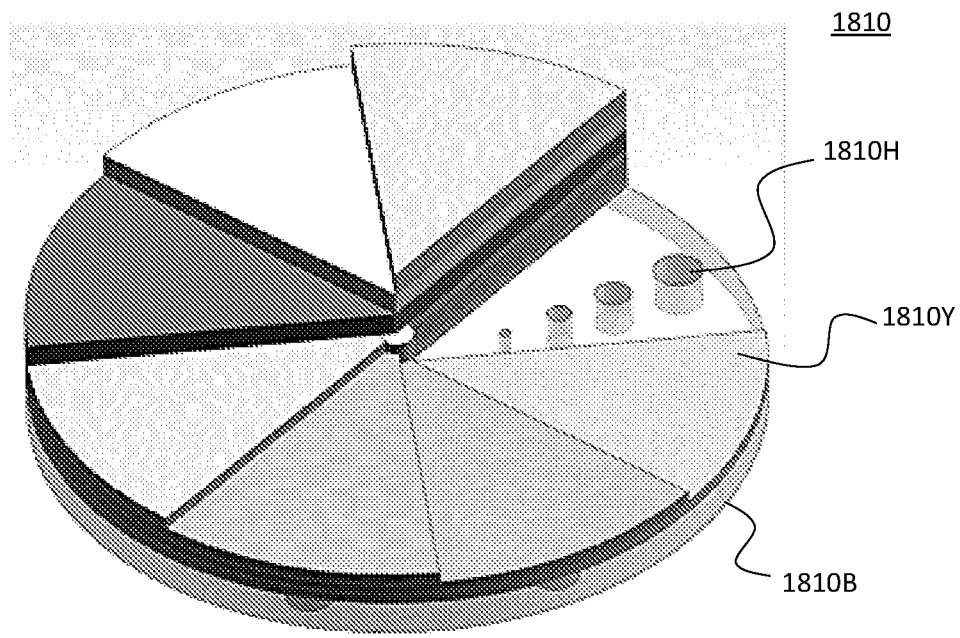
FIG. 18 shows a perspective view of an exemplary embodiment of a sixth test element of the plurality of test elements.

FIG. 18 shows a perspective view of an exemplary embodiment of a sixth test element 1810 of the plurality of test elements 1100E. Sixth test element 1810 may be suitable for testing the wire resolution of the scanner 10. Sixth test element 1810 may include a base layer 1810B having a plurality of holes 1810H of different widths and a plurality of layers 1810Y on the base layer 1810B. Each of the plurality of layers 1810Y on top of a bottom layer 1810Y may have a smaller area than the bottom layer 1810Y such that the bottom layer 1810Y may be exposed. The lowest layer 1810Y of the plurality of the layers 1810Y may have a smaller area than the base layer 1810B such that the base layer 1810B is exposed. Base layer 1810B may be circular and each of the plurality of layers 1810Y may be a sector of a circle. For example, the lowest layer 1810Y may be a sector with an internal angle of 320°, the next layer 1810Y on top thereof may be a sector with an internal angle of 280°, the next layer 1810Y on top thereof may be a sector with an internal angle of 240°, the next layer 1810Y on top thereof may be a sector with an internal angle of 200°, the next layer 1810Y on top thereof may be a sector with an internal angle of 160°, the next layer 1810Y on top thereof may be a sector with an internal angle of 120°, the next layer 1810Y on top thereof may be a sector with an internal angle of 80°, and the next layer 1810Y on top thereof may be a sector with an internal angle of 40°. Plurality of layers 1810Y may be aligned along one side thereof forming a flat surface. As shown in FIG. 18, the plurality of layers 1810Y may form a plurality of sectors of different heights. Base layer may be made of acrylic.

Figure 18A:
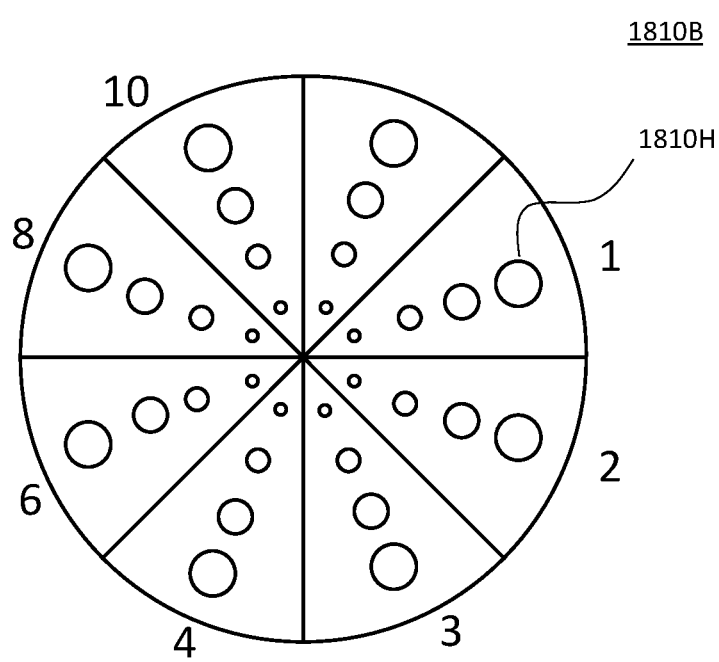
FIG. 18A shows a schematic diagram of the top view of the base plate in FIG. 18.

FIG. 18A shows a schematic diagram of the top view of the base layer 1810 in FIG. 18. Plurality of holes 1810H may be arranged in a row with the width of the holes 1810H in descending order such that the hole with the widest width is at one end of the row and the hole with the narrowest width is at the other end of the row. Plurality of holes 1810H may be through holes. Base layer 1810B may include a plurality of rows of holes 1810H. Plurality of rows of holes 1810H may extend radially from the centre of the base layer 1810B and spaced apart equally from each other. Plurality of holes 1810H may be circular. Plurality of holes 1810H may have widths in the range of 1 mm to 3 mm. The widths of the plurality of holes 1810H may be 0.5 mm, 1.0 mm, 2.0 mm, 3.0 mm.

FIG. 18C shows an exemplary embodiment of the user evaluation interface 1812 for a test piece 1100. User evaluation interface 1812 may be the scoring table for the sixth test element 1810. Scoring table may include a plurality of ROIs, e.g. Test Region 1, Test Region 2, etc.

FIG. 18D shows of a matrix 1812M for calculating the first score value and second score value of the fifth test element. System 100 may include a matrix 1812M for test elements 1100E with more than one dimension. For example, the sixth test element 1810 may have a first dimension of the width of the plurality of holes 1810H and a second dimension of the thickness of the plurality of sectors. Matrix 1812M may include both dimensions and the corresponding score values for the dimensions. As shown in the matrix 1812M, the score value for the thickest layer 1810Y and widest width, e.g. 7 mm and 3.0 mm, may have the highest weight or score value.

For the objective evaluation, a template for the sixth test element 1810 may be retrieved by the processor 100P and mapped onto the scanned image of the sixth test element 1810. A plurality of ROIs of the scanned image may be determined based on the template. For example, the ROI may be the plurality of holes 1810H and the region around each hole in each of the plurality of sectors. Processor 100P may be configured to calculate the mean value of the pixels in each of the plurality of holes 1810H and mean value of the background of each of the plurality of holes 1810H, which is provided by the plurality of layers 1810Y. Processor 100P may be configured to assign a "visible" status if the difference in the mean value of the hole and background is at least one standard deviation and assign the corresponding score value based on the matrix 1812M. Processor 100P may be configured to assign the corresponding score value of the ROI based on the scoring table. The same steps may be taken for each of the plurality of holes 1810H in each of the plurality of sectors. For subjective evaluation, the system 100 may prompt the user to identify the number of holes 1810H visible in each of the plurality of sectors and input into the system 100 via the multimedia module 100U and/or I/O interface 100N. Processor 100P may be configured to receive the input assign a corresponding score value based on the matrix 1812M. Once the scoring table is completed, the system 100 may generate the first score value and the second score value for each performance characteristic of the scanner 10, i.e. wire resolution, to evaluate the scan quality of the scanner 10.

FIG. 19 shows an exemplary embodiment of the overall score summary table 1912. When the scanned images of the plurality of test elements 1100E have been evaluated, the system 100 may generate an overall first score value and overall second score value for the test piece based on the individual first score values and individual second score values of the plurality of test elements 1100E as shown in FIG. 19.

System 100 may be suitable to be used on any one of the above embodiments of test piece. First score value and second score value may be normalised so that the scores obtained from each test piece are standardised.

System 100 may include a mobile device, e.g. a mobile phone, tablet, laptop, a computer, etc.

Processor 100P typically controls overall operations of the system 100, such as the operations associated with display, telephone calls, data communications, view operations, and recording operations. The processor 100P may include one or more processor to execute instructions to perform all or part of the steps in the above described methods. Moreover, the processor 100P may include one or more modules which facilitate the interaction between the processor 100P and other modules. For instance, the processor 100P may include a multimedia module to facilitate the interaction between the multimedia module 100U and the processor 100P. System 100 may be in communication with a server via a network.

Memory 100M may be configured to store various types of data to support the operation of the system 100. For example, the data may include instructions for any applications or above methods operated on the system, contact data, phonebook data, messages, pictures, video, etc. Memory 100M may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

Multimedia module 100U may include a screen providing an output interface between the system 100 and the user. In some embodiments, the screen may include a liquid crystal display (LCD), organic light-emitting diode (OLED), a touch panel, etc. If the screen includes the touch panel, the screen may be implemented as a touch screen to receive input signals from the user. Touch panel may include one or more touch sensors to sense touches, swipes, and gestures on the touch panel. The touch sensors may not only sense a boundary of a touch or swipe action, but also sense a period of time and a pressure associated with the touch or swipe action.

Audio module 100A may be configured to output and/or input audio signals. For example, the audio module 100A may include a microphone ("MIC") configured to receive an external audio signal when the system 100 is in an operation mode, such as a call mode, a recording mode, and a voice recognition mode. The received audio signal may be further stored in the memory 100M or transmitted via the communication module 100C. In some embodiments, the audio module 100A further includes a speaker to output audio signals.

I/O interface 100N provides an interface between the processor 100P and peripheral interface modules, such as a keyboard, a click wheel, buttons, and the like.

Communication module 100C may be configured to facilitate communication, wired or wirelessly, between the system 100 and other devices or the server. System 100 may access a wireless network based on a communication standard, such as WiFi, 2G, or 3G, LTE, and 4G cellular technologies or a combination thereof. In one exemplary embodiment, the communication module 100C may receive a broadcast signal or broadcast associated information from an external broadcast management system via a broadcast channel. In one exemplary embodiment, the communication module 100C may further include a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

A skilled person would appreciate that the features described in one example may not be restricted to that example and may be combined with any one of the other examples.

The present invention relates to a system for evaluating the scan quality of a scanner on a test piece and a method thereof generally as herein described, with reference to and/or illustrated in the accompanying drawings.

The invention claimed is:

1. A test system comprising:
a system for evaluating a scan quality of an X-ray scanner for scanning cargo, and
a test piece comprising a plurality of test panels or test elements, each of the plurality of test panels or test elements is designed to test a pre-determined scan quality of the scanner, wherein the scanner is adapted to scan the test piece,
wherein the system comprises,
a processor configured to communicate with the scanner; and
a memory in communication to the processor for storing instructions executable by the processor,
wherein the processor is configured to:
receive a plurality of scanned images of the plurality of test panels or test elements of the test piece from the scanner, the plurality of scanned images for evaluating a plurality of the pre-determined scan qualities of the scanner,
display the plurality of scanned images,
generate a first plurality of score values for the plurality of pre-determined scan qualities of the scanner based on the plurality of scanned images,
display an evaluation input interface configured to receive user evaluation input based on the evaluation of the plurality of scanned images, and
generate a second plurality of score values for the plurality of pre-determined scan qualities of scanner based on the user evaluation input of the plurality of scanned images,
retrieve a plurality of pre-determined first threshold score values and a plurality of pre-determined second threshold score values and compare the plurality of first score values and the plurality of second score values against the plurality of pre-determined first threshold score values and the plurality of pre-determined second threshold score values respectively, and
generate a failed signal if one or more of the plurality of first score values is lower than the plurality of pre-determined first threshold score values or one or more of the plurality of pre-determined second score values is lower than the plurality of pre-determined second threshold score values,
wherein the first plurality of score values and the second plurality of score values are utilized to evaluate the scan quality of the scanner.

2. The test system according to claim 1, wherein the processor is configured to determine at least one region of interest (ROI) in each of the plurality of scanned images and analyze the at least one ROI to generate the first plurality of score values.

3. The test system according to claim 2, wherein the processor is configured to retrieve a template comprising at least one pre-determined ROI, map the template onto one of the plurality of scanned images to determine the at least one ROI in the each of the plurality of scanned images.

4. The test system according to claim 2, wherein the processor is configured to extract image data from the at least one ROI in each of the plurality of scanned images and generate statistical data from the extracted image data to analyze the image data of the at least one ROI.

5. The test system according to claim 2, wherein the at least one of ROI is determined based on one of the plurality of test panels or test elements of the test piece.

6. The test system according to claim 3, wherein the template is determined based on one of the plurality of test panels or test elements of the test piece.

7. The test system according to claim 1, wherein the test piece is optimized for transmission X-ray image quality analysis.

8. The test system according to claim 7, wherein each of the plurality of scanned images has an image resolution in a range of 0.3 mm to 10 mm spatial resolution.

9. The test system according to claim 7, wherein the scanner has a field of view in a range of 300 mm×300 mm to 4500 mm×6000 mm.

10. The test system according to claim 7, wherein the scanner has a linear X-ray system with a scanning speed in a range of 0.01 m/s to 100 km/h.

11. The test system according to claim 1, wherein the test piece is optimized for backscatter X-ray image quality analysis.

12. The test system according to claim 11, wherein the scanner has a field of view in a range of 300 mm×300 mm to 5000 mm×12000 mm spatial resolution.

13. The test system according to claim 11, wherein the scanner has a linear backscatter scanning system with a scanning speed in a range of 0.01 m/s to 20 km/h.

14. The test system according to claim 11, wherein each of the plurality of scanned images has an image resolution in a range of 0.5 mm to 20 mm.

15. The test system according to claim 1, wherein the plurality of pre-determined scan qualities of the scanner comprises at least one of contrast, effective nuclear charge, density resolution, extent of beam hardening effect on the scanner, spatial resolution, contrast resolution, spatial resolution, sensitivity to metal artefacts, grid and spatial resolution, sensitivity to small inclusions, penetration level, ability to discriminate between material of different composition, and wire resolution.

16. The test system according to claim 1, wherein the plurality of test panels of the test piece are spaced apart from each other along a longitudinal axis, wherein each of the plurality of test panels is perpendicular to the longitudinal axis.

17. The test system according to claim 1, wherein the test piece comprises a base panel comprising a first plurality of the test elements and a longitudinal axis, a rotatable panel comprising a second plurality of the test elements and pivotally connected to the base panel along the longitudinal axis, wherein the rotatable panel is rotatable about the longitudinal axis.

18. The test system according to claim 1, wherein the test piece is optimized for CT image quality analysis.

19. The test system according to claim 18, wherein the scanner has a field of view in a range of 100 mm×100 mm to 2000 mm×2000 mm.

20. The test system according to claim 18, wherein each of the plurality of scanned images has an image resolution in a range of 0.5 mm to 10.0 mm reconstructed voxel.

21. The test system according to claim 18, wherein the scanner has a helical scan system with a scanning speed in a range of 0.01 m/s to 10.00 m/s.

22. A computer-implemented method for evaluating a scan quality of an X-ray scanner for scanning cargo, the scanner adapted to scan a test piece comprising a plurality of test panels or test elements, each of the plurality of test panels or test elements is designed to test a pre-determined scan quality of the scanner, the method comprising:
receiving a plurality of scanned images of the plurality of test panels or test elements of the test piece from the scanner, the plurality of scanned images for evaluating a plurality of the pre-determined scan qualities of the scanner,
displaying the plurality of scanned images,
generating a first plurality of score values for the plurality of pre-determined scan qualities of the scanner based on the plurality of scanned images,
displaying an evaluation input interface configured to receive user evaluation input based on the evaluation of the plurality of scanned images, and
generating a second plurality of score values for the plurality of pre-determined scan qualities based on the user evaluation input of the plurality of scanned images,
retrieving a plurality of pre-determined first threshold score values and a plurality of pre-determined second threshold score values and comparing the first plurality of score values and the second plurality of score values against the plurality of pre-determined first threshold score values and the plurality of pre-determined second threshold score values respectively, and
generating a failed signal if one or more of the first plurality of score values is lower than the plurality of pre-determined first threshold score values or one or more of the second score values is lower than the plurality of pre-determined second threshold score values,
wherein the first plurality of score values and the second plurality of score values are utilized to evaluate the scan quality of the scanner.

23. The method according to claim 22, further comprising determining at least one region of interest (ROI) in each of the plurality of scanned images and analyzing the at least one ROI to generate the first plurality of score values.

24. The method according to claim 22, further comprising retrieving a template comprising at least one pre-determined ROI, mapping the template onto one of the plurality of scanned images to determine at least one ROI in the each of the plurality of scanned images.

25. The method according to claim 22, further comprising extracting image data from at least one ROI in each of the plurality of scanned images and generating statistical data from the extracted image data to analyze the image data of the at least one ROI.

26. The method according to claim 22, wherein the plurality of test panels of the test piece are spaced apart from each other along a longitudinal axis, wherein each of the plurality of test panels is perpendicular to the longitudinal axis.

27. The method according to claim 22, wherein the test piece comprises a base panel comprising a first plurality of test elements and a longitudinal axis, a rotatable panel comprising a second plurality of test elements and pivotally connected to the base panel along the longitudinal axis, wherein the rotatable panel is rotatable about the longitudinal axis.

28. A non-transitory computer readable storage medium comprising instructions, wherein the instructions, when executed by a processor in a system, cause the system to:
  receive a plurality of scanned images of a plurality of test panels or test elements of a test piece from a scanner, wherein each of the plurality of test panels or test elements is designed to test a pre-determined scan quality of the scanner, the plurality of scanned images for evaluating a plurality of the pre-determined scan qualities of the scanner,
  display the plurality of scanned images,
  generate a first plurality of score values for the plurality of pre-determined scan qualities of the scanner based on the plurality of scanned images,
  display an evaluation input interface configured to receiving user evaluation input based on the evaluation of the plurality of scanned images,
  generating a second plurality of score values for the plurality of pre-determined scan qualities based on the user evaluation input of the plurality of scanned images,
  retrieving a plurality of pre-determined first threshold score values and a plurality of pre-determined second threshold score values and comparing the first plurality of score values and the second plurality of score values against the plurality of pre-determined first threshold score values and the plurality of pre-determined second threshold score values respectively, and
  generating a failed signal if one or more of the first plurality of score values is lower than the plurality of pre-determined first threshold score values or one or more of the second score values is lower than the plurality of pre-determined second threshold score values,
  wherein the first plurality of score values and the second plurality of score values are utilized to evaluate the scan quality of the scanner.

* * * * *